United States Patent
Elshafie et al.

(10) Patent No.: US 11,929,956 B2
(45) Date of Patent: Mar. 12, 2024

(54) ACK/NACK-BASED RELAYING SCHEME FOR UPLINK COVERAGE IMPROVEMENT

(71) Applicant: QUALCOMM Incorporated, San Diego, CA (US)

(72) Inventors: Ahmed Elshafie, San Diego, CA (US); Seyedkianoush Hosseini, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 17/448,350

(22) Filed: Sep. 21, 2021

(65) Prior Publication Data

US 2022/0094503 A1   Mar. 24, 2022

Related U.S. Application Data

(60) Provisional application No. 63/081,823, filed on Sep. 22, 2020.

(51) Int. Cl.
  *H04B 7/155* (2006.01)
  *H04L 5/00* (2006.01)
  *H04W 72/20* (2023.01)

(52) U.S. Cl.
  CPC .......... *H04L 5/0055* (2013.01); *H04B 7/155* (2013.01); *H04W 72/20* (2023.01)

(58) Field of Classification Search
  CPC .......... H04L 5/0055; H04L 2001/0097; H04L 1/1671; H04L 1/1812; H04L 1/1864;
  (Continued)

(56) References Cited

U.S. PATENT DOCUMENTS

2010/0035541 A1*  2/2010  Kim ............... H04B 7/2606
                                                   455/9
2011/0310789 A1   12/2011  Hu et al.
(Continued)

FOREIGN PATENT DOCUMENTS

KR       20100019920 A       2/2010

OTHER PUBLICATIONS

On the Energy Efficiency of Cooperative Communications in Wireless Sensor Networks, Ahmed K. Sadek Qualcomm Incorporated, WEIYU Microsoft Corporation and K. J. Ray Liu University of Maryland, College Park, ACM Transactions on Sensor Networks, vol. 6, No. 1, Article 5, Publication date: Dec. 2009 (Year: 2009).*

(Continued)

*Primary Examiner* — Sithu Ko
*Assistant Examiner* — Malick A Sohrab
(74) *Attorney, Agent, or Firm* — Shumaker & Sieffert, P.A.

(57) ABSTRACT

An acknowledgment (ACK)/negative-ACK (NACK)-based relaying scheme for uplink coverage improvement is provided. A relay station receives, from a destination device, a first feedback transmission associated with the first data transmission. The relay station determines whether the destination device successfully receives the first data transmission based on the first feedback transmission. The relay station communicates, with the destination device, a second feedback transmission associated with the first data transmission when the destination device does not successfully receive the first data transmission. The relay station communicates, with the destination device, a second data transmission associated with the second feedback transmission, in which the second data transmission comprises at least a portion of the first data transmission.

28 Claims, 10 Drawing Sheets

(58) Field of Classification Search
CPC ....... H04L 1/16; H04B 7/155; H04B 7/15557; H04W 72/20; H04W 88/04
See application file for complete search history.

(56) References Cited

U.S. PATENT DOCUMENTS

| | | | | |
|---|---|---|---|---|
| 2012/0008545 | A1* | 1/2012 | Zhang | H04L 1/1829 370/315 |
| 2012/0170481 | A1* | 7/2012 | Kimura | H04B 7/15542 370/252 |
| 2017/0310427 | A1* | 10/2017 | Wakabayashi | H04L 1/1854 |
| 2018/0198465 | A1* | 7/2018 | Ericson | H04L 1/0061 |

OTHER PUBLICATIONS

Chafnaji, H., et al., "Turbo Packet Combining for Relaying Schemes Over Multiantenna Broadband Channels", IEEE Transactions on Vehicular Technology, IEEE, USA, vol. 61, No. 7, Sep. 1, 2012 (Sep. 1, 2012), XP011460641, pp. 2965-2977, ISSN: 0018-9545, DOI: 10.1109/TVT.2012.2201761 p. 1, col. 2, Paragraph 2, Figure 1 p. 2-p. 4.

International Search Report and Written Opinion—PCT/US2021/051604—ISA/EPO—dated Dec. 21, 2021.

Sadek, A.K., et al., "On the Energy Efficiency of Cooperative Communications in Wireless Sensor Networks", ACM Transactions on Sensor Networks, ACM, 2 Penn Plaza, Suite 701 New York NY 10121-0701 USA, vol. 6, No. 1, Jan. 5, 2010 (Jan. 5, 2010), XP058217202, pp. 1-21, ISSN: 1550-4859, DOI: 10.1145/1653760.1653765 p. 11-p. 12.

* cited by examiner

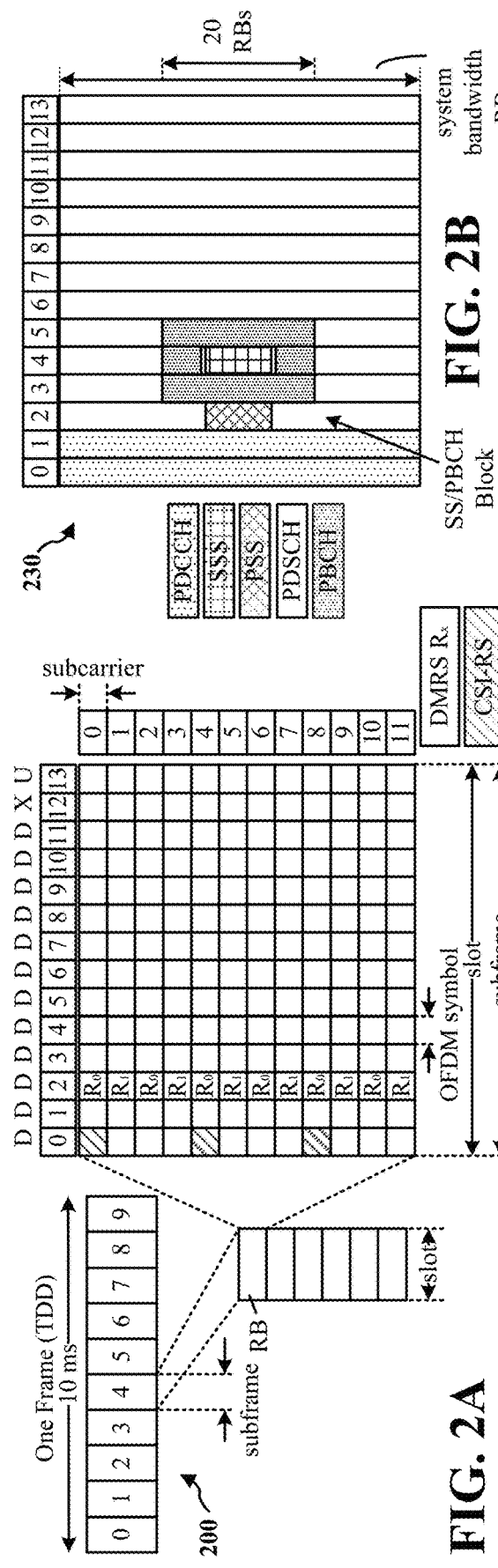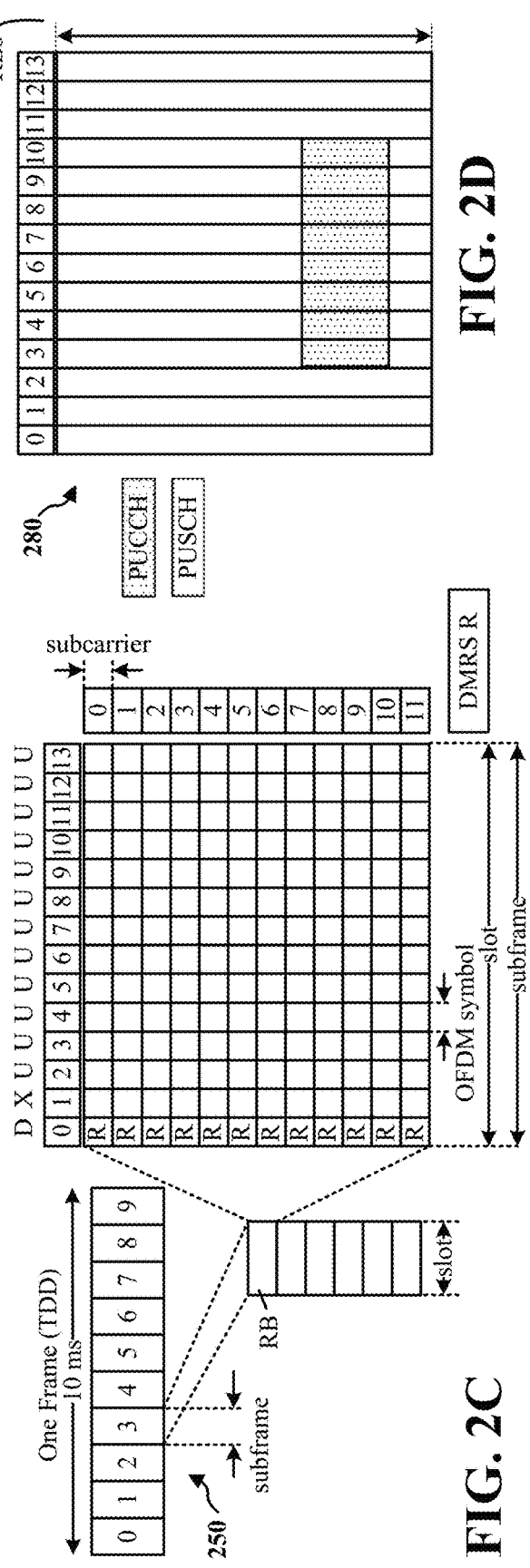

ACK/NACK-BASED RELAYING SCHEME FOR UPLINK COVERAGE IMPROVEMENT

CROSS REFERENCE TO RELATED APPLICATION(S)

This application claims the benefit of U.S. Provisional Patent Application Ser. No. 63/081,823, entitled "ACK/NACK-BASED RELAYING SCHEME FOR UPLINK COVERAGE IMPROVEMENT" and filed on Sep. 22, 2020, which is expressly incorporated by reference herein in its entirety.

BACKGROUND

Technical Field

The present disclosure relates generally to communication systems, and more particularly, to acknowledgment (ACK)/negative-ACK (HACK)-based relaying scheme for uplink coverage improvement.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A wireless communication system may include a number of base stations that can support communication for a number of user equipment (UEs). A UE may communicate directly with a base station if a communication channel between the UE and the base station has acceptable quality. The UE may communicate indirectly with the base station via a relay station if the communication channel between the UE and the base station has poor quality. The relay station may facilitate communication between the UE and the base station by receiving a first signal from a downstream station (e.g., the UE), processing the first signal to obtain a second signal, and forwarding the second signal to an upstream station (e.g., the base station).

Relay stations can be provided in wireless communication systems to improve uplink coverage by increasing network capacity and decreasing transmission latency. In particular, relay stations can operate in one of multiple relay modes. In one example, a relay station can autonomously facilitate communication between UEs and base stations. For example, the relay station can independently determine the type of data relaying (or relaying scheme) with a base station, over a backhaul link. The relay node can subsequently apply the determined type of data relaying on the backhaul link to the base station. In another example, the relay station can receive a downlink configuration that instructs the relay station as to which type of data relaying to apply in its uplink transmission to the base station. It may be desirable to improve the uplink coverage between the UE and the base station via the relay station.

According to aspects of the present disclosure, a relay station supporting multiple relay modes is provided. The relay station can listen for a data transmission (e.g., uplink communication or a sidelink communication) from a source UE that is directed to a base station. The relay station also can listen for a feedback transmission, such as a hybrid automatic repeat request (HARQ) transmission, from the base station that indicates whether the base station successfully received the data transmission from the source UE. The relay station can determine whether it also successfully received the data transmission from the source UE. The relay station can communicate with at least one of the base station or another UE its feedback relating to the data transmission from the source UE. In an example, the relay station can transmit a HARQ transmission indicating whether it successfully received at least in part the data transmission from the source UE. In some aspects, the relay station can operate in a first relay mode where it receives control information from the base station that indicates how the relay station should transmit (or forward) data relating to the data transmission to the base station. In other aspects, the relay station can operate in a second relay mode where the relay station determines the type of data relaying independent of the base station. The relay station can communicate a data transmission with the base station that forwards at least in part (or in its entirety) the data transmission from the source UE based at least in part on the determined type of data relaying. In this regard, the uplink coverage between the base station and the source UE can be improved.

In an aspect of the disclosure, a method, a computer-readable medium, and an apparatus are provided for wireless communication at a first UE. The apparatus receives, from a second UE, a first data transmission on a first set of resources. The apparatus receives, from a destination device, a first feedback transmission associated with the first data transmission. The apparatus determines whether the destination device successfully receives the first data transmission based on the first feedback transmission. The apparatus communicates, with the destination device, a second feedback transmission associated with the first data transmission when the destination device does not successfully receive the first data transmission. The apparatus communicates, with the destination device, on a second set of resources corresponding to at least a portion of the first set of resources, a second data transmission associated with the second feedback transmission according to a type of data relaying, the second data transmission comprising at least a portion of the first data transmission, wherein the second data transmission is communicated using different types of data relaying based at least in part on the second feedback transmission.

In another aspect of the disclosure, a method, a computer-readable medium, and an apparatus are provided for wireless communication at a destination device. The apparatus receives, from a first UE of a plurality of UEs, a first data transmission. The apparatus communicates, with the plurality of UEs, a first feedback transmission associated with the first data transmission that indicates whether the first data transmission is successfully received at the destination device. The apparatus receives, from a second UE of the plurality of UEs, a second feedback transmission associated with the first data transmission when the first feedback transmission indicates that the destination device does not successfully receive the first data transmission. The apparatus receives, from the second UE, a second data transmission associated with the second feedback transmission, in which the second data transmission comprises at least a portion of the first data transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
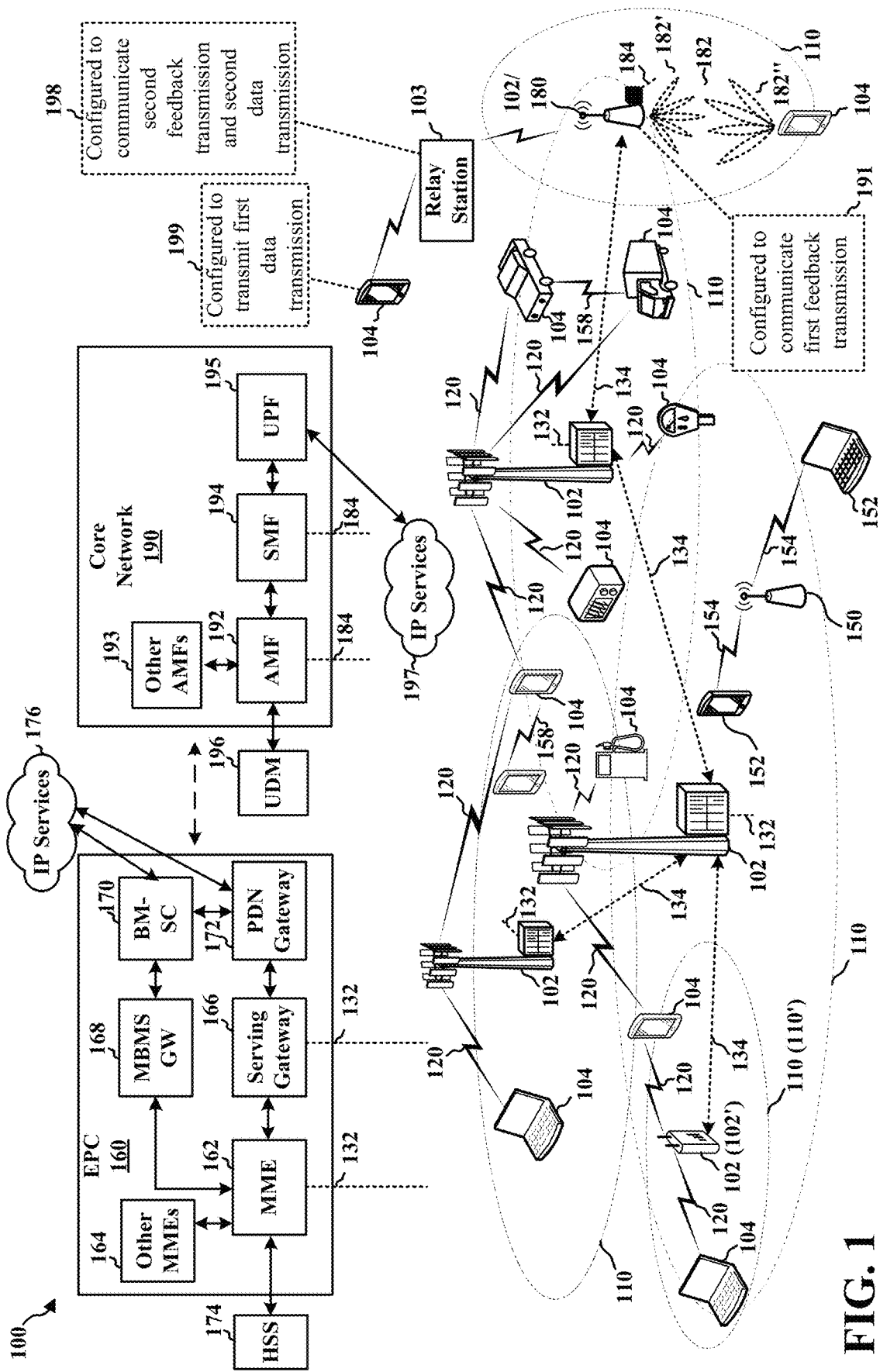
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., Si interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a relay station 103 may receive a signal from a UE 104 and may relay the signal to a base station 102, 180 based on feedback of the base station 102/180, and/or may receive a signal from the UE 104 and may relay the signal to another relay UE (not shown). The base station 102, 180 may be configured to determine feedback information indicating whether a data transmission sent directly from the UE 104 is successfully received at the base station 102/180 and communicate the first feedback information to the UE 104 and the relay station 103 (191). The relay station 103 may be configured to receive a first data transmission transmitted from the UE 104 and the first feedback information from the base station 102/180 and communicate second feedback information associated with the first data transmission and a second data transmission with the base station 102/180 (198). The UE 104 may be configured to transmit the first data transmission to the base station and the relay station 103 (199). By having the relay station 103 forward a separate data transmission that includes at least in part the first data transmission along with feedback to the base station 102/180, the uplink coverage between the UE 104 and the base station 102/180 can be improved. For example, the success rate of the base station 102/180 recovering uplink data transmissions from the UE 104 can be increased and the system latency of uplink transmissions between the UE 104 and the base station 102/180 can be reduced. Although the following description may be focused on a mmW relay including different types of data forwarding such as decode-forward, amplify-forward, compress-forward and log-likelihood ratio relaying schemes, the concepts described herein may be applicable to other similar areas, such as low-frequency repeaters.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
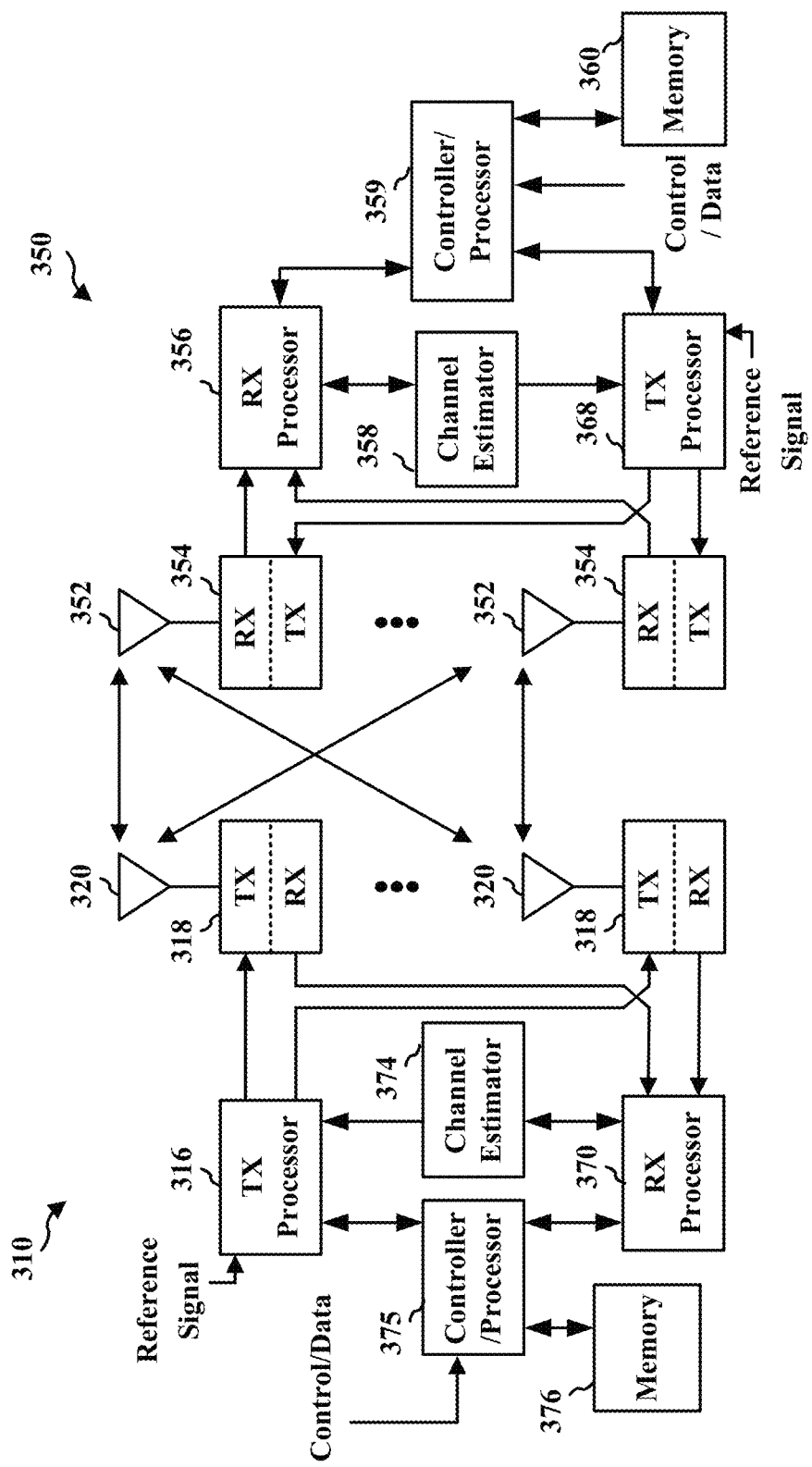
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 191 of FIG. 1.

A mobile communication system may include a relay. A relay may also be referred to as a repeater. A relay may assist in forwarding messages between a base station and a UE. The UE may transmit a message for the base station, and the relay may receive the message for the base station and re-transmit the message to the base station. Similarly, the relay may additionally or alternatively receive a message from a UE and re-transmit the message to another UE serving as an additional relay. In some aspects, a relay may receive and re-transmit messages in a high-frequency spectrum (e.g., the relay may be a mmW relay).

According to aspects of the present disclosure, the UE 350 may operate as a relay station that supports multiple relay modes. The relay station can listen for an uplink transmission from a source UE (e.g., 104, 350) that is directed to a base station (e.g., 310). The relay station also can listen for a feedback transmission, such as a hybrid automatic repeat request (HARQ) transmission (e.g., ACK/NACK), from the base station that indicates whether the base station successfully received the uplink transmission from the source UE. The relay station can determine whether it also successfully received the uplink transmission from the source UE. The relay station can communicate with at least one of the base station or another UE its feedback relating to the uplink transmission from the source UE. In an example, the relay station can transmit a HARQ transmission indicating whether it successfully received at least in part the uplink transmission from the source UE (e.g., ACK/NACK). In some aspects, the relay station can operate in a first relay mode where it receives control information from the base station that indicates how the relay station should transmit (or forward) data relating to the source uplink transmission to the base station. In other aspects, the relay station can operate in a second relay mode where the relay station determines the type of data relaying independent of the base station. The relay station can communicate with the base station a data transmission that forwards at least in part (or in its entirety) the uplink transmission from the source UE based at least in part on the determined type of data relaying. In this regard, the uplink coverage between the base station and the source UE can be improved.

In some implementations, the relay station may be capable of receiving some control by the base station when it is operating in a first relay mode. For example, the base station may control how the relay station is relaying uplink messages from a UE to the base station using a type of data relaying (e.g., decode-forward relaying scheme, amplify-forward relaying scheme, compress-forward relaying scheme, or LLR relaying scheme). In other implementations, the relay station may operate without control from the base station when it is operating in a second relay mode. In this regard, the relay station may autonomously determine the type of data relaying to the base station.

In some aspects, the relay station may receive a signal, decode the signal successfully, and forward a re-encoded signal or a new signal based on the decoded signal (e.g., may operate in a decode-forward relaying scheme). The relay station may send a HARQ transmission, such as an acknowledgment, to the base station based on the successful decoding of the received signal. The relay station may perform digital baseband processing of the received signal.

In some aspects, the relay station may receive a signal, determine that the signal was not successfully received, amplify the power of a portion of the (or the full) received signal to generate a repeat signal, and forward the repeat signal to the base station (e.g., may operate in an amplify-forward relaying scheme). In some aspects, the relay station may perform analog amplify-forward relaying scheme, where the relay station receives and processes an analog signal. In this regard, the relay station may not perform partial relaying, and the UE may apply a change in amplification (and/or a gain) to received data (from the source UE) and forward the received data with the applied amplification in its entirety as received. The time and/or frequency resources utilized by the source UE and the relay UE may be the same.

In some aspects, the relay station may receive a signal, quantize a portion of the (or the full) signal using a predetermined number of bits, and forward the quantized signal to the base station (e.g., may operate in a compress-forward relaying scheme). The relay station may perform digital baseband processing of the received signal.

In some aspects, the relay station may receive a signal, obtain log-likelihood ratio values of the received signal, quantize the log-likelihood ratio values using a predetermined number of bits, and forward the quantized LLR signal to the base station (e.g., may operate in a LLR relaying scheme). The relay station may perform digital baseband processing of the received signal.

Figure 4:
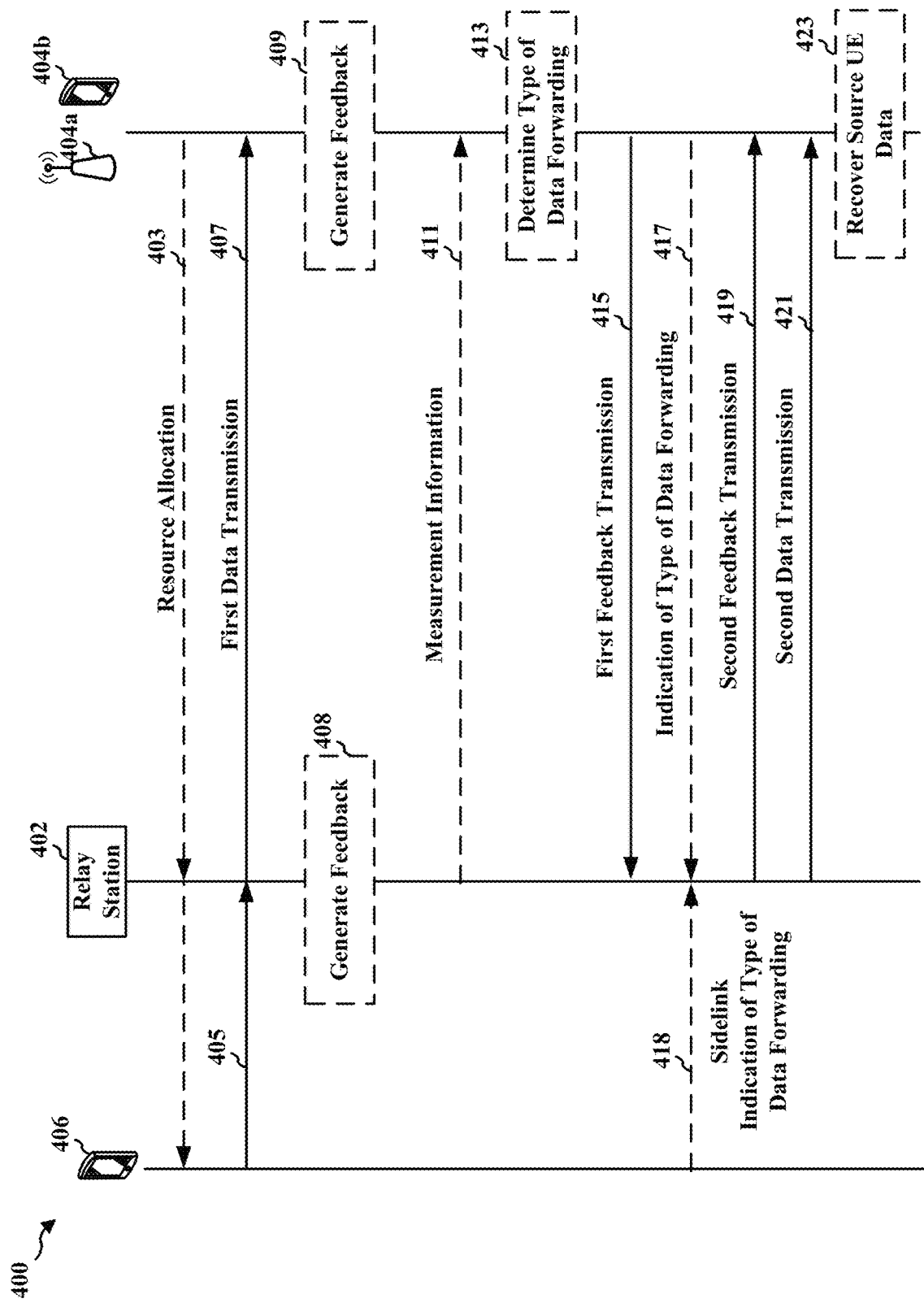
FIG. 4 is a communication diagram illustrating communication between a base station, a relay station, and a UE that includes feedback information exchange between the base station and the relay for uplink coverage improvement.

FIG. 4 is a communication diagram illustrating communication between a destination device 404a/404b, a relay station 402, and a UE 406 that includes feedback information exchange between the destination device 404a/404b and the relay station 402 for uplink coverage improvement. The destination device 404a may be a base station in some implementations, and the destination device 404b may be a UE in other implementations. Although the aspects described in connection with FIG. 4 are described for uplink communication relayed between the UE 406 and the destination device 404a, the aspects may similarly be applied to sidelink communication that the relay station 402 relays between the destination device 404b and the UE 406 through a sidelink channel. In some examples, the UE 406 and the relay station 402 may communicate over a sidelink channel and the relay station 402 and the destination device 404a may communicate over downlink/uplink channels. In other examples, the UE 406 and the relay station 402 may communicate over a sidelink channel (e.g., PC5 interface) and the relay station 402 and the destination device 404b also may communicate over a sidelink channel. In some examples, the relay station 402 and/or the UE 406 may each represent a UE, an IoT device, or a wearable device.

For data transmission on the uplink, UE 406 may transmit data on an access uplink to relay station 402, which may forward the data on a backhaul uplink to destination device 404a. The destination device 404a may transmit feedback information on a backhaul downlink to the relay station 402. The relay station 402 may transmit feedback information on the backhaul uplink to the destination device 404a. The relay station 402 can transmit data on the backhaul uplink to the destination device 404a. In some aspects, the communication channel between the UE 406 and the destination device 404a through the relay station 402 includes a dedicated uplink tunnel with multi-hop relaying via UE relays in a dedicated time-frequency resource. The destination device 404a may transmit a broadcast message or a groupcast message to the UE 406 and the relay station 402 to set up the multi-hop relay tunnel. The relay tunnel may have a wide frequency band with a short transmission latency between the UE 406 and the destination device 404a through the relay station 402.

The feedback information sent on one link (e.g., the downlink) may support data transmission on the other link (e.g., the uplink). The feedback information may comprise channel quality indicator (CQI) indicative of the quality of a communication channel, a HARQ transmission such as ACK for packets decoded correctly or NACK for packets decoded in error, and/or other information. The subject technology may support a relaying scheme through HARQ for data transmission on the downlink and/or the uplink in order to improve coverage and reliability of data transmissions. For HARQ, a transmitter may send a transmission of a data packet to a receiver and may send one or more additional transmissions of the packet, if needed, until the packet is decoded correctly by the receiver, or the maximum number of transmissions has been sent for the packet, or some other termination condition is encountered. Each transmission of the packet may include different redundancy information for the packet and may be referred to as a HARQ transmission. The receiver may decode the packet based on all HARQ transmissions received for the packet, which may improve the likelihood of correctly decoding the packet.

As illustrated at 403, the destination device 404a may transmit a downlink control transmission comprising a resource allocation assigned to one or more of the UE 406 or the relay station 402. For example, the destination device 404a may be the base station 102/180 described above with respect to FIG. 1 and may indicate to the relay station 402 and/or the UE 406 uplink resource allocation. In some examples, the uplink resource allocation may include a first uplink grant assigned to the UE 406 and a second uplink grant assigned to the relay station 402. In some aspects, the downlink control transmission includes a bitmap indicating which resource blocks within the resource allocation are assigned to the relay station 402. For example, the bitmap may indicate which resources (or data inside those resources) from the source UE transmission to be forwarded by the relay UE (i.e., data in those resource block resources may be forwarded by the relay UE under any one of the data forwarding relaying schemes including the decode-forward relaying scheme). In other examples, the bitmap may be a certain time-domain bitmap indicating which symbols within the resource allocation to forward. In some examples, if the bitmap is disabled or the bitmap contains all ones, then the bitmap may indicate that full (or entire) data forwarding is used at the relay UE. In some aspects, the downlink control transmission may be transmitted semi-statically through a radio resource control (RRC) signal or a media access control (MAC) control element (MAC-CE). In other aspects, the downlink control transmission can be transmitted dynamically through downlink control information (DCI). In some examples, the bitmap can be transmitted statically or semi-statically through the RRC signal or MAC-CE. In other examples, the bitmap can be dynamically changing through the uplink DCI used to configure the relaying process.

At 405, the UE 406 may transmit a first data transmission in an uplink channel intended for the destination device 404a. The data transmission from the UE 406 may be received at the destination device 404a in its entirety, in part, or not at all (e.g., 407). In cases where the UE 406 is located far from the destination device 404a and the signal quality between the UE 406 and destination device 404a is below acceptable levels, a relaying scheme with one or more intermediate relay stations to improve the uplink coverage is desirable. In this regard, the data transmission from the UE 406 also may be received at destination device 404a the relay station 402. In some aspects, the relay station 402 may listen on a frequency for the uplink transmission from the UE 406 to receive the data transmission. For example, the relay station 402 may receive the data transmission through an uplink communication channel (e.g., PUSCH) with the UE 406. In other aspects, the UE 406 and the relay station 402 may communicate over a sidelink communication channel. In this regard, the relay station 402 may receive the data transmission through the sidelink communication channel with the UE 406. In some aspects, if the relay station 402 does not have the capability to receive the uplink transmission from the UE 406 (e.g., relay station 402 is not equipped with a wireless Uu gNB modem), then the relay 402 may transmit the data transmission on an uplink resource based on an uplink grant along with transmitting the data transmission on a sidelink resource based on a sidelink grant, such that the relay station 402 receives the data transmission on the sidelink resource and relays the data transmission to the destination device 404a on behalf of the UE 406 based on the uplink resource.

At 408, the relay station 402 may generate feedback information, such as ACK/NACK information. For example, the relay station 402 receives the data transmission from the UE 406 and performs a decoding operation to recover data in the data transmission. If the relay station 402 is successful in decoding all data packets in the data transmission, then the relay station 402 may generate ACK information. Otherwise, the relay station 402 does not successfully decode all of the data packets (or successfully decoded a partial number of data packets) such that the relay station 402 may generate NACK information. Similarly, at 409, the destination device 404a may generate feedback information based on a processing of the received data transmission from the UE 406. If the data packets are not decoded successfully, the destination device 404a may generate NACK information. Otherwise, the destination device 404a generates ACK information for successful decoding of data packets in the data transmission. Although FIG. 4 illustrates blocks 407 and 409 performed concurrently after the first data transmission 405, the operations illustrated in blocks 407 and 409 may occur at different times and in a different sequence than as illustrated.

In some aspects, the relay station 402 may communicate measurement information 411 to the destination device 404a. The measurement information 411 may include measurements of the backhaul link between the relay station 402 and the destination device 404a (either directly linked or linked through one or more additional relays). The measurement information 411 may include measurements of an access link between the relay station 402 and the UE 406 (either directly linked or linked through one or more additional relays). In some aspects, the relay station 402 may operate in a selected data forwarding relaying scheme (e.g., decode-forward, amplify-forward, compress-forward, LLR-forward) and the measurement information may include a measured or estimated end-to-end signal to noise ratio when operating in the data forwarding relaying scheme. The measurement information may include channel measurements such as channel state information (CSI) or measurements of noise and/or interference levels at a receiver (e.g., 354) of the relay station 402. In some aspects, the UE 406 may additionally or alternatively communicate such measurement information (not shown) to the destination device 404a. As noted above, the aspects illustrated for UE 406 may be performed by another relay node. Therefore, the base station may receive measurement information or other information from a relay node, and may use the information from the other relay node to determine the type of data relaying scheme for the relay station 402. In some implementations, the destination device 404a may obtain similar measurements at a receiver of the destination device 404a for determining the type of data relaying scheme for the relay station 402.

In some aspects, the destination device 404a may determine a type of data relaying for the relay station 402, as illustrated at 413, when the base station determines that it did not successfully receive (or decode) one or more data packets in the data transmission from the UE 406. In this regard, the relay station 402 may be configured to operate as a relay in a first relay mode (e.g., configured by downlink configuration) that relays to the destination device 404a with a selected type of data relaying destination device 404a. In some aspects, the destination device 404a may select the type of data relaying among multiple types, at 413, based on the measurement information 411 provided to the destination device 404a by the relay station 402. Where the measurement information 411 includes CSI and/or noise/interference levels on a channel to the UE 406 and/or to the destination device 404a, the destination device 404a may determine the type of data relaying as to how a data communication between the relay station 402 and the destination device 404a will be sent. For example, in a use case where the relay station 402 successfully receives and decodes the data transmission and generates ACK information, the relay station 402 may utilize a decode-forward relaying scheme where the relay station 402 may re-encode the data packets and forward the re-encoded data to the destination device 404a. In other implementations, the relay station 402 may utilize any other relaying scheme (e.g., amplify-forward, compress-forward, LLR-forward) when the relay station 402 successfully receives and decodes the data transmission and generates the ACK information. In other aspects where the relay station 402 does not successfully receive (or decode) the data transmission and generates NACK information, the relay station 402 may perform a partial data forwarding or full data forwarding in accordance with a selected type of data relaying. For example, the relay station may forward partial (or full) LLR information in a LLR-forward relaying scheme (since data compression can be used), partial (or full) amplified observations (e.g., received signal) in an amplify-forward relaying scheme, quantized observations in a compress-forward relaying scheme, so that the destination device 404a may combine the signals from the UE 406 and the relay station 402.

As illustrated at 415, the destination device 404a may transmit a first feedback transmission. In some aspects, the first feedback transmission is, or includes at least a portion of, the feedback information generated at block 409. The first feedback transmission is associated with the first data transmission that indicates whether the first data transmission is successfully received at the destination device 404a. For example, the first feedback transmission may include ACK information indicating that the destination device 404a successfully decoded data packets carried in the data transmission from the UE 406. In other examples, the first feedback transmission may include NACK information indicating that the destination device 404a did not successfully decode the data transmission from the UE 406.

In some implementations, at 417, the destination device 404a may optionally transmit an indication of the selected type of data relaying for configuration of the relay station 402. In some aspects, the indication 417 may be transmitted concurrently with the first feedback transmission from the destination device 404a, or may be transmitted at a different time than the first feedback transmission 415. In this regard, the destination device 404a may expect to receive a data transmission that includes partial (or full) forwarding data in a subsequent slot or symbol duration. For example, if the destination device 404a and the relay station 402 agreed to use the LLR-forward relaying scheme, then the destination device 404a may expect to receive LLR information. In some aspects, the indication of the selected type of data relaying may be received at the relay station 402 dynamically through DCI signaling, or statically or semi-statically through the RRC signal or MAC-CE signaling.

In other implementations, at 418, the UE 406, in sidelink communication with the relay station 402, may optionally transmit an indication of the selected type of data relaying for configuration of the relay station 402. In some aspects, the indication of the selected type of data relaying may be received at the relay station 402, through a sidelink PC5 interface, dynamically through SCI signaling (e.g., SCI-2 or second-stage SCI), or statically or semi-statically through a RRC signal or MAC-CE signaling.

At 419, the relay station 402 may transmit a second feedback transmission that indicates whether the relay station 402 successfully received (or decoded) data packets of the data transmission from the UE 406. In some aspects, the relay station 402 transmits the second feedback transmission in a UCI portion of a PUCCH if the relay station 402 is communicating with the destination device 404a operating as a base station, or if the relay station 402 is communicating with the destination device 404b operating as a UE having the capability to receive uplink communication from the relay station 402 (e.g., by having a gNB modem). In other implementations, the relay station 402 and the destination device 404b may be communicating over a sidelink channel such that the relay station 402 can transmit the second feedback transmission in sidelink control information (SCI) over a physical sidelink feedback channel (PSFCH).

In some aspects, the second feedback transmission is, or includes at least a portion of, the feedback information generated at block 407. For example, if the destination device 404a receives an ACK, the destination device 404a infers that the relay station 402 can utilize a decode-forward relaying scheme. As such, the destination device 404a may expect to receive a re-encoded data signal. In other implementations, the destination device 404a may infer that the relay station 402 utilized any other relaying scheme (e.g., amplify-forward, compress-forward, LLR-forward) when the destination device 404a receives the ACK. In another example, if the destination device 404a receives a NACK, and if the destination device 404a and the relay station 402 agreed to use the LLR-forward relaying scheme, then the destination device 404a may expect to receive LLR information (or quantized LLR information). In still another example, if the destination device 404a receives a NACK, and if the destination device 404a and the relay station 402 agreed to use an observations (e.g., received signals at the relay station 402) relaying scheme, then the destination device 404a may expect to receive a weighted and amplified version of the observations for an amplify-forward relaying scheme, or alternatively, a quantized and forwarded version of the data observed at the receiver of the relay station 402 for a compress-forward relaying scheme.

At 421, the relay station 402 may transmit a second data transmission associated with the second feedback transmission. In some aspects, the second data transmission may be a partial forwarding where the second data transmission includes at least a portion of the first data transmission. In other aspects, the second data transmission may be a full forwarding where the second data transmission includes the first data transmission in its entirety. In some implementations, the relay station 402 may be configured to perform a partial data forwarding in a first forwarding transmission to the destination device 404a. If the destination device 404a does not successfully receive the forwarded data from the relay station 402, the relay station 402 may perform a full data forwarding in a second forwarding transmission to the destination device 404a in a subsequent slot (or symbol duration). In some aspects, the relay station 402 transmits the second data transmission over a PUSCH if the relay station 402 is communicating with the destination device 404a operating as a base station, or if the relay station 402 is communicating with the destination device 404b operating as a UE having the capability to receive uplink communication from the relay station 402 (e.g., by having a gNB modem). In other implementations, the relay station 402 and the destination device 404b may be communicating over a sidelink channel such that the relay station 402 can transmit the second data transmission over a PSSCH.

As illustrated at 423, the destination device 404a may recover the data packets carried in the first data transmission from the UE 406 to thereby improve the uplink coverage between the UE 406 and destination device 404a. The destination device 404a may recover the UE 406 data by combining the signals from the UE 406 and the relay station 402. For example, the destination device 404a may reconstruct the data signals by summing at least a portion of the data signals carried in the first data transmission with data signals carried in the second data transmission (forwarding at least partial data).

Figure 5:
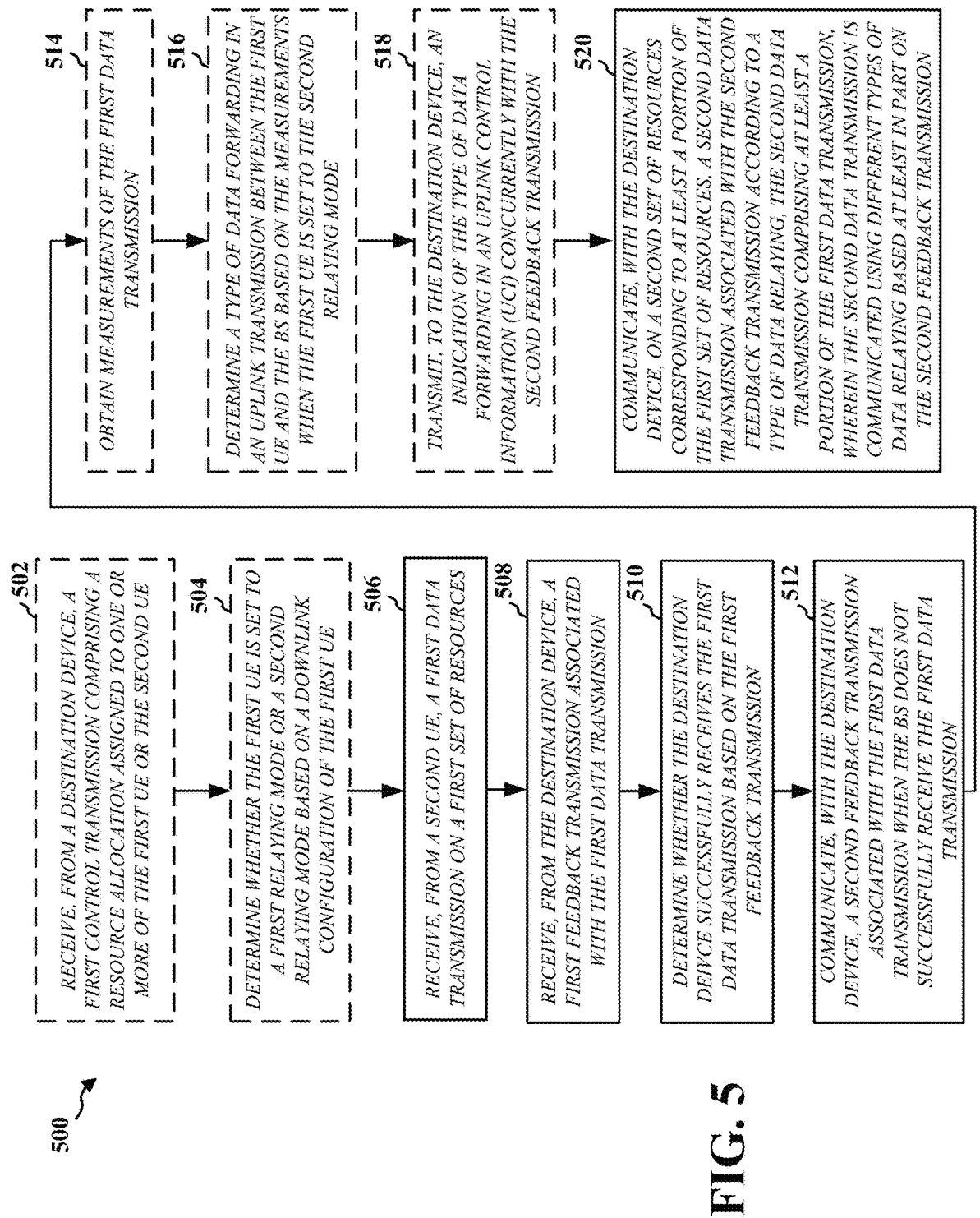
FIG. 5 is a flowchart of a method of wireless communication at a relay.

FIG. 5 is a flowchart 500 of a method of wireless communication. The method may be performed by a relay node or a component of a relay node (e.g., relay station 103, 402; the apparatus 602/602'; or the processing system 714, which may include the memory 360 and which may be the entire relay station 402 or a component of the relay station 402, such as the TX processor 368, the RX processor 356, and/or the controller/processor 359). Optional aspects are illustrated with a dashed line. As used herein, the term "relay station" may be referred to as a relay node or a relay, and the terms may be used interchangeably.

At 502, the relay node may receive, from a destination device (e.g., a base station 102/180, or a UE 104), a first control transmission comprising a resource allocation assigned to one or more of the relay node or a source UE (e.g., UE 104). The first control transmission may be received, e.g., by the reception component 604 of the apparatus 602. In some aspects of receiving the first control transmission, the relay node may receive the first control transmission semi-statically through one or more of a RRC signal or MAC-CE. In other aspects of receiving the first control transmission, the relay node may receive the first control transmission dynamically through DCI. In some aspects, the first control transmission includes a bitmap indicating which resource blocks within the resource allocation are assigned to the relay node and/or which data in the resource blocks is forwarded by the relay node using one of a plurality of types of data forwarding in an uplink transmission to the destination device.

In some aspects, at 504, the relay node may determine whether the relay node is set to a first relay mode or a second relay mode based on a downlink configuration of the relay node. The relay mode may be determined, e.g., by the determination component 612 of the apparatus 602. In some aspects, the first control transmission indicates a type of data relaying in an uplink transmission between the relay node and the destination device when the relay node is set to the first relay mode.

In some aspects, at 506, the relay node may receive, from the source UE, a first data transmission. The first data transmission may be received, e.g., by the determination component 612 and measurement component 616 through the reception component 604 of the apparatus 602.

At 508, the relay node may receive, from the destination device, a first feedback transmission associated with the first data transmission. The first feedback transmission may be received, e.g., by the determination component 612 through the reception component 604 of the apparatus 602.

In some aspects, at 510, the relay node may determine whether the destination device successfully receives the first data transmission based on the first feedback transmission. The determination may be performed, e.g., by the determination component 612 and/or the feedback component 614 of the apparatus 602.

At 512, the relay node may communicate, with the destination device, a second feedback transmission associated with the first data transmission when the destination device does not successfully receive the first data transmission. The second feedback transmission may be communicated, e.g., by the feedback component 614 through the transmission component 610 of the apparatus 602. In some implementations, the relay node may determine whether the first data transmission is successfully received at the relay node. In some aspects of communicating the second feedback transmission, the relay node may transmit the second feedback transmission that includes an ACK signal associated with the first data transmission when the first data transmission is successfully received. In other aspects, the second feedback transmission may include a NACK signal associated with the first data transmission when the first data transmission is not successfully received.

At 514, the relay node may obtain measurements of the first data transmission. The measurements may be obtained, e.g., by the measurement component 616 of the apparatus 602.

At 516, the relay node may determine a type of data relaying in an uplink transmission between the relay node and the destination device based on the measurements when the relay node is set to the second relay mode. The determination may be performed, e.g., by the determination component 612 of the apparatus 602. In some aspects of determining the type of data relaying, the relay node may select one of a plurality of types of data forwarding in the uplink transmission between the relay node and the destination device based on the measurements of the first data transmission. In various aspects, the plurality of types of data forwarding includes, among others, a decode-forward relaying scheme, an amplify-forward relaying scheme, a compress-forward relaying scheme, or a LLR-forward relaying scheme.

In some implementations, the relay node may determine whether the second feedback transmission includes the ACK signal or the NACK signal. If the second feedback transmission includes the ACK signal, then the relay node may encode data of the first data transmission into encoded data based on a type of data relaying signaled between the relay node and the destination device. In this regard, the preconfigured type of data relaying is a decode-forward relaying scheme. In some aspects, the communication of the second data transmission as forwarded data to the destination device may include the encoded data.

If the second feedback transmission includes the NACK signal, then the relay node may follow the agreed type of data relaying. For example, the relay node may determine LLR information associated with the first data transmission using a predetermined number of bits. In this respect, the LLR information may quantized according to the predetermined number of bits. The predetermined number of bits used for quantizing may be signaled through semi-static control information or dynamic control information (e.g., the first control information at block 502). In some aspects, the communication of the second data transmission as forwarded data to the destination device may include at least in part the LLR information as partial (or full data forwarding).

In another example, the relay node may amplify data of the first data transmission into amplified data by weighting data packets in the first data transmission with one or more of weights and gain values. In some aspects, the communication of the second data transmission as forwarded data to the destination device may include at least in part the amplified data as partial (or full data forwarding).

In still another example, the relay node may compress data of the first data transmission into compressed data by quantizing data packets in the first data transmission using a predetermined number of bits. The predetermined number of bits used for quantizing may be signaled through semi-static control information or dynamic control information (e.g., the first control information at block 502). In some aspects, the communication of the second data transmission as forwarded data to the destination device may include at least in part the compressed data as partial (or full data forwarding).

At 518, the relay node may transmit, to the destination device, an indication of the type of data relaying in an uplink control information concurrently with the second feedback transmission. The indication of the type of data relaying may be transmitted, e.g., by the determination component 612 through the transmission component 610 of the apparatus 602.

At 520, the relay node may communicating, with the destination device, on a second set of resources corresponding to at least a portion of the first set of resources, a second data transmission associated with the second feedback transmission according to a type of data relaying. In some examples, the second data transmission may be relayed to the destination device as a partial data relay. In this regard, the second data transmission includes at least a portion of the first data transmission. In other examples, the second data transmission may be relayed to the destination device as a full data relay. In some aspects, the second data transmission is communicated using different types of data relaying based at least in part on the second feedback transmission. For example, the relay node may transmit the second data transmission using any one of the types of data relaying (e.g., decode-forward, amplify-forward, compress-forward, LLR-forward) when the second feedback transmission indicates an ACK is observed. When the second feedback transmission indicates a NACK is observed, the relay node may transmit the second data transmission using a different type of data relaying compared to when the ACK is used. For example, the relay node may forward using partial LLR forwarding, partial or full amplify-forward, or quantization (along with compress-forward). The second data transmission may be communicated, e.g., by the data generation component 608 through the transmission component 610 of the apparatus 602. In some aspects of communicating the second data transmission, the relay node may transmit the second data transmission in a format that corresponds to the type of data relaying. In some aspects, the relay node may transmit, to the destination device, the second data transmission in the resource blocks indicated in the bitmap (included in the first control transmission). In some aspects, the second data transmission includes a partial (or full) data payload of the first data transmission.

In some implementations, following block 520, the relay node may receive, from the destination device, a third feedback transmission associated with the second data transmission. The relay node may determine whether the destination device successfully receives the second data transmission based on the third feedback transmission. In the event that the destination device did not successfully receive (or decode) the forwarded data from the relay node, the destination device may transmit new control information. In this regard, the relay node may receive, from the destination device, a second control transmission when the destination device does not successfully receive the second data transmission. In some aspects, the second control transmission is, or includes at least a portion of, downlink control information. In this regard, the relaying procedure may restart between the relay node and the destination device or the source UE may send a new data transmission directed to the destination device.

Figure 6:
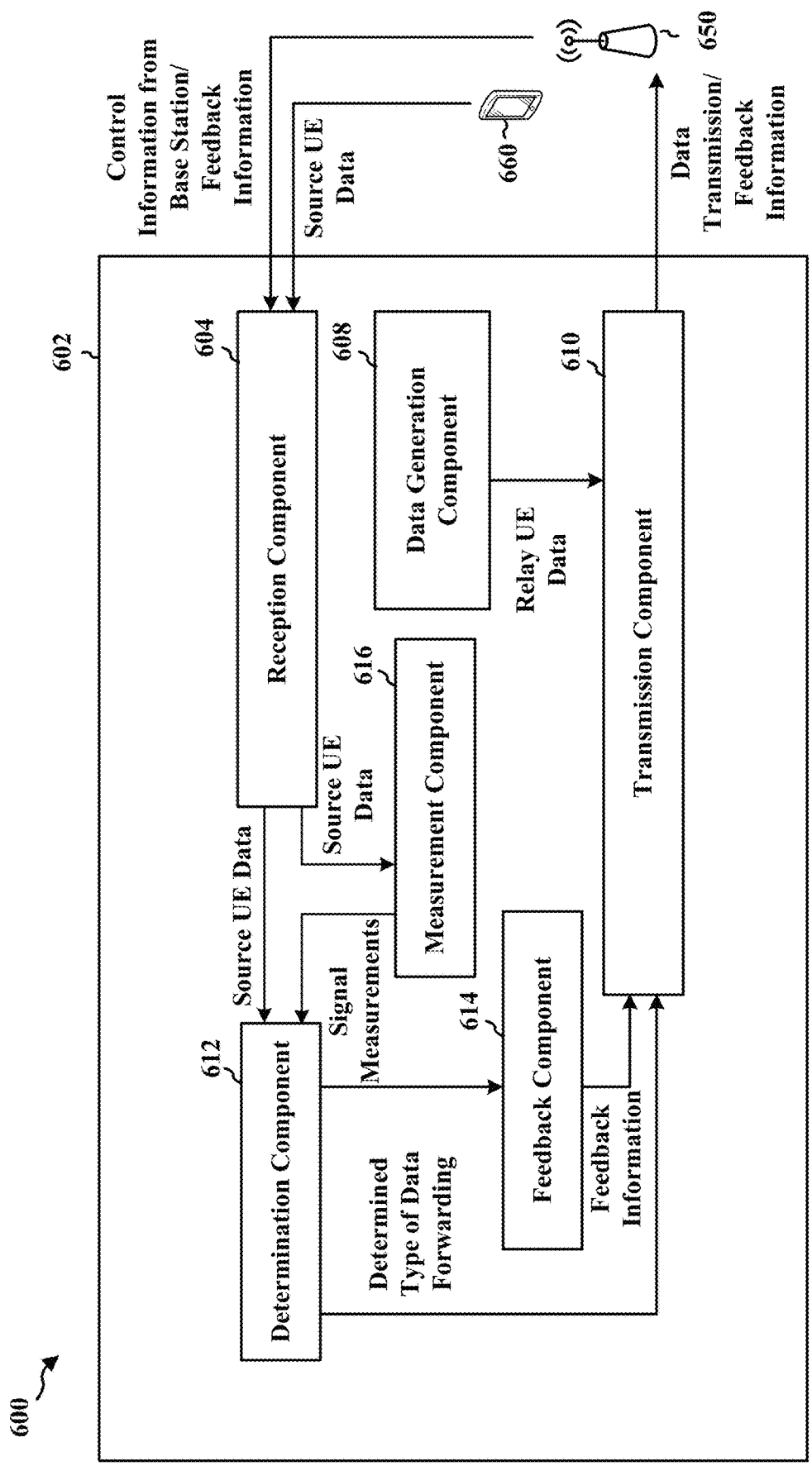
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus may be a relay node or a component of a relay node. The apparatus includes reception component 504 that receives communication from a base station 650 or from a source UE (e.g., UE 104, UE 406). The reception component 504 may receive information from the base station 650 and may be configured to communicate with the base station 650 and/or wireless device served by the relay (such as a UE) based on a feedback transmission, such as a HARQ transmission, from the base station 650, e.g., as described above in connection with 508 in FIG. 5. The apparatus includes a transmission component 610 configured to transmit communication to the base station 650. The transmission component 610 may transmit feedback information associated with an uplink data transmission of the source UE or a data forwarding transmission to the base station 650, and may be configured to communicate with the base station 650 based on a type of data relaying configuration for the relay node, e.g., as described above in connection with 516 in FIG. 5. The apparatus includes a measurement component 616 configured to receive uplink data from the source UE and obtain signal measurements of the received uplink data, e.g., as described above in connection with 514 in FIG. 5. The apparatus includes a feedback component 614 configured to determine feedback information relating to the uplink data transmission of the source UE and provide the feedback information in a HARQ transmission to the base station 650, as described above in connection with 512 in FIG. 5. The apparatus includes a data generation component 608 configured to generate forwarding data using one of a plurality of types of data forwarding relaying schemes (e.g., decode-forward, amplify-forward, compress-forward, LLR-forward) using partial (or the full) received signal of the uplink data transmission and transmit the forwarding data to the base station 650, e.g., as described above in connection with 520 in FIG. 5.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
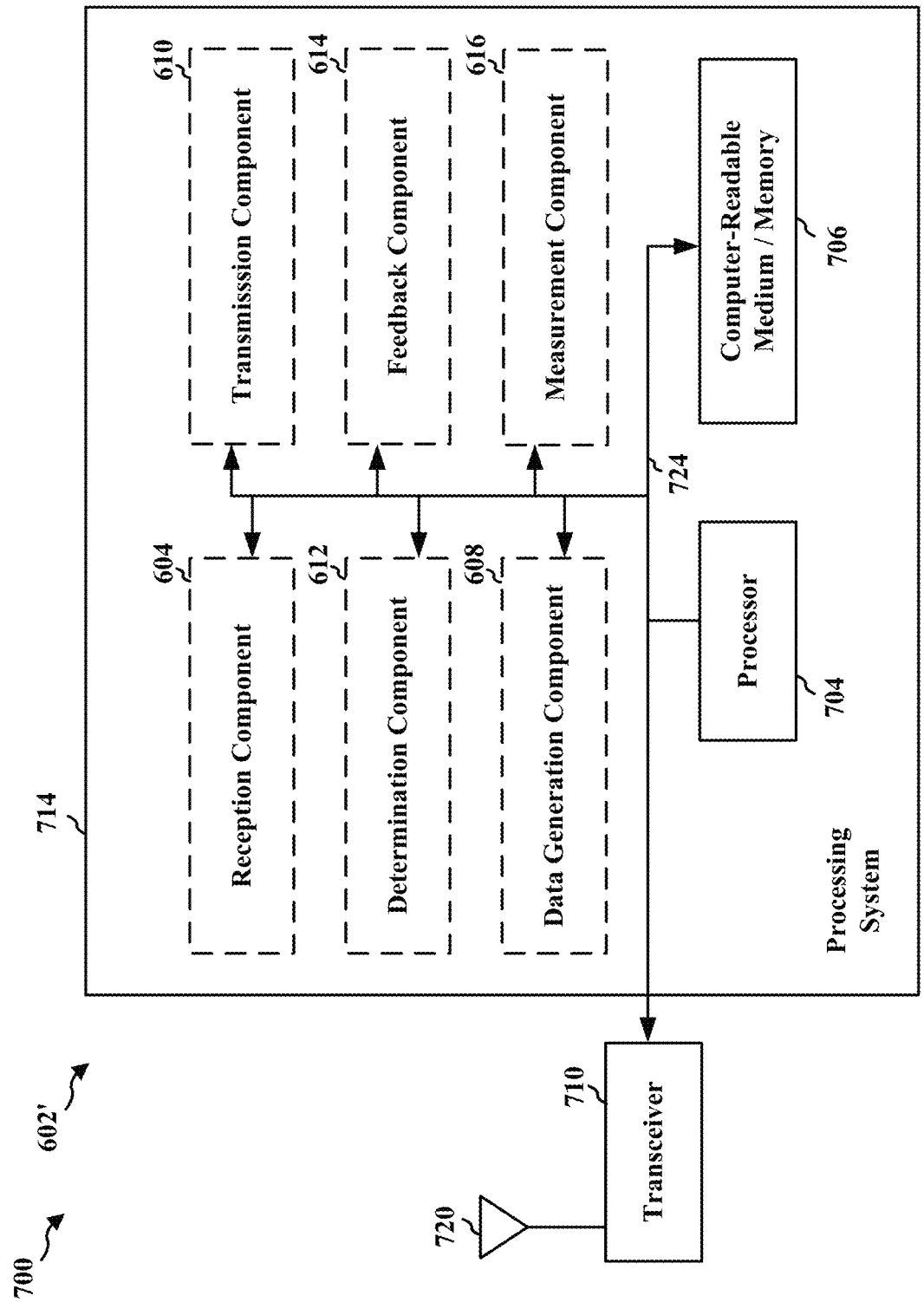
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 608, 610, 612, 614 and 616, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 610, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 608, 610, 612, 614 and 616. The components may be software components running in the processor 704, resident/stored in the computer readable medium/memory 706, one or more hardware components coupled to the processor 704, or some combination thereof.

In one configuration, the apparatus 602/602' for wireless communication includes means for receiving, from a second UE, a first data transmission. The apparatus may include means for receiving, from a BS, a first feedback transmission associated with the first data transmission. The apparatus may include means for determining whether the BS successfully receives the first data transmission based on the first feedback transmission. The apparatus may include means for communicating, with the BS, a second feedback transmission associated with the first data transmission when the BS does not successfully receive the first data transmission. The apparatus may include means for communicating, with the BS, a second data transmission associated with the second feedback transmission, in which the second data transmission comprises at least a portion of the first data transmission. The aforementioned means may be one or more of the aforementioned components of the apparatus 602 and/or the processing system 714 of the apparatus 602' configured to perform the functions recited by the aforementioned means. The processing system 714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 8:
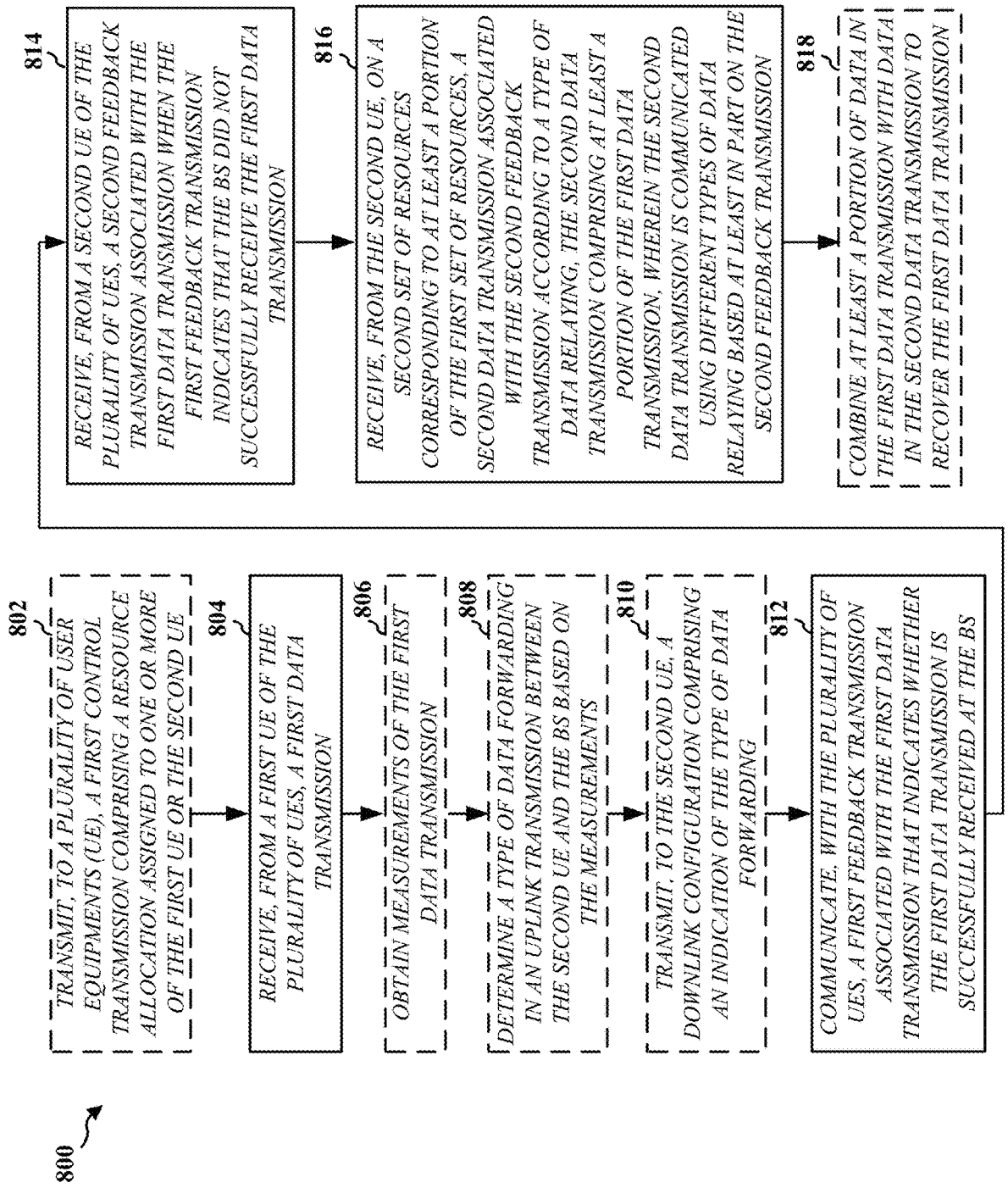
FIG. 8 is a flowchart of a method of wireless communication at a base station.

FIG. 8 is a flowchart 800 of a method of wireless communication. In some implementations, the method may be performed by a base station or a component of a base station as a destination device (e.g., the base station 102, 180, 310, 404a; the apparatus 902/902'; the processing system 1014, which may include the memory 376 and which may be the entire base station 310 or a component of the base station 310, such as the TX processor 316, the RX processor 370, and/or the controller/processor 375). In other implementations, the method may be performed by a UE node or a component of a UE node as the destination device (e.g., UE 104, 404b; the apparatus 602/602'; or the processing system 714, which may include the memory 360 and which may be the entire UE node or a component of the UE node, such as the TX processor 368, the RX processor 356, and/or the controller/processor 359). Optional aspects are illustrated with a dashed line.

At 802, the destination device may transmit, to a plurality of UEs (e.g., the relay station 402, the UE 406), a first control transmission comprising a resource allocation assigned to one or more of the relay station 402 or the UE 406. The first control transmission may be transmitted, e.g., by the configuration component 908 through the transmission component 910 of the apparatus 902.

In some aspects, at 804, the destination device may receive, from a source UE (e.g., UE 406) of a plurality of UEs, a first data transmission. The first data transmission may be received, e.g., by the reception component 904 of the apparatus 902.

At 806, the destination device may obtain measurements of the first data transmission. The signal measurements may be obtained, e.g., by the measurement component 916 of the apparatus 902. In some aspects, the measurements may include at least one of a first measurement report for a backhaul link between the relay station 402 and the destination device, or a second measurement report indicating a signal-to-noise ratio (SNR) estimation for the first data transmission.

At 808, the destination device may determine a type of data relaying in an uplink transmission between the source UE and the destination device based on the obtained signal measurements. The determination may be performed, e.g., by the determination component 914 of the apparatus 902. In other implementations, the destination device may receive, from the relay station 402 concurrently with the second feedback transmission, an indication of a type of data relaying for an uplink transmission between the relay station 402 and the destination device through uplink control information.

At 810, the destination device may transmit, to the relay station 402, a downlink configuration comprising an indication of the type of data relaying. The downlink configuration may be transmitted, e.g., by the configuration component 908 through the transmission component 910 of the apparatus 902.

At 812, the destination device may communicate, with the plurality of UEs, a first feedback transmission associated with the first data transmission that indicates whether the first data transmission is successfully received at the destination device. Therefore, the communication may be performed, e.g., by the feedback component 912 through the transmission component 910 of the apparatus 902.

At 814, the destination device may receiving, from the relay station 402, a second feedback transmission associated with the first data transmission when the first feedback transmission indicates that the BS did not successfully receive the first data transmission. The second feedback transmission may be received, e.g., by the reception component 904 of the apparatus 902.

At 816, the destination device may receive, from the relay station 402, on a second set of resources corresponding to at least a portion of the first set of resources, a second data transmission associated with the second feedback transmission according to a type of data relaying. In some examples, the second data transmission may be relayed to the destination device as a partial data relay. In this regard, the second data transmission includes at least a portion of the first data transmission. In other examples, the second data transmission may be relayed to the destination device as a full data relay. In some aspects, the second data transmission is communicated using different types of data relaying based at least in part on the second feedback transmission. For example, the relay station 402 may transmit the second data transmission using any one of the types of data relaying (e.g., decode-forward, amplify-forward, compress-forward, LLR-forward) when the second feedback transmission indicates an ACK is observed at the relay station 402. When the second feedback transmission indicates a NACK is observed at the relay station 402, the relay node may transmit the second data transmission using a different type of data relaying compared to when the ACK is used. For example, the relay station 402 may forward using partial LLR forwarding, partial or full amplify-forward, or quantization (along with compress-forward). The second data transmission may be received, e.g., by the reception component 904 of the apparatus 902.

At 818, the destination device may combine at least a portion of data in the first data transmission with data in the second data transmission to recover the first data transmission. The combination may be performed, e.g., by the determination component 914 of the apparatus 902.

Figure 9:
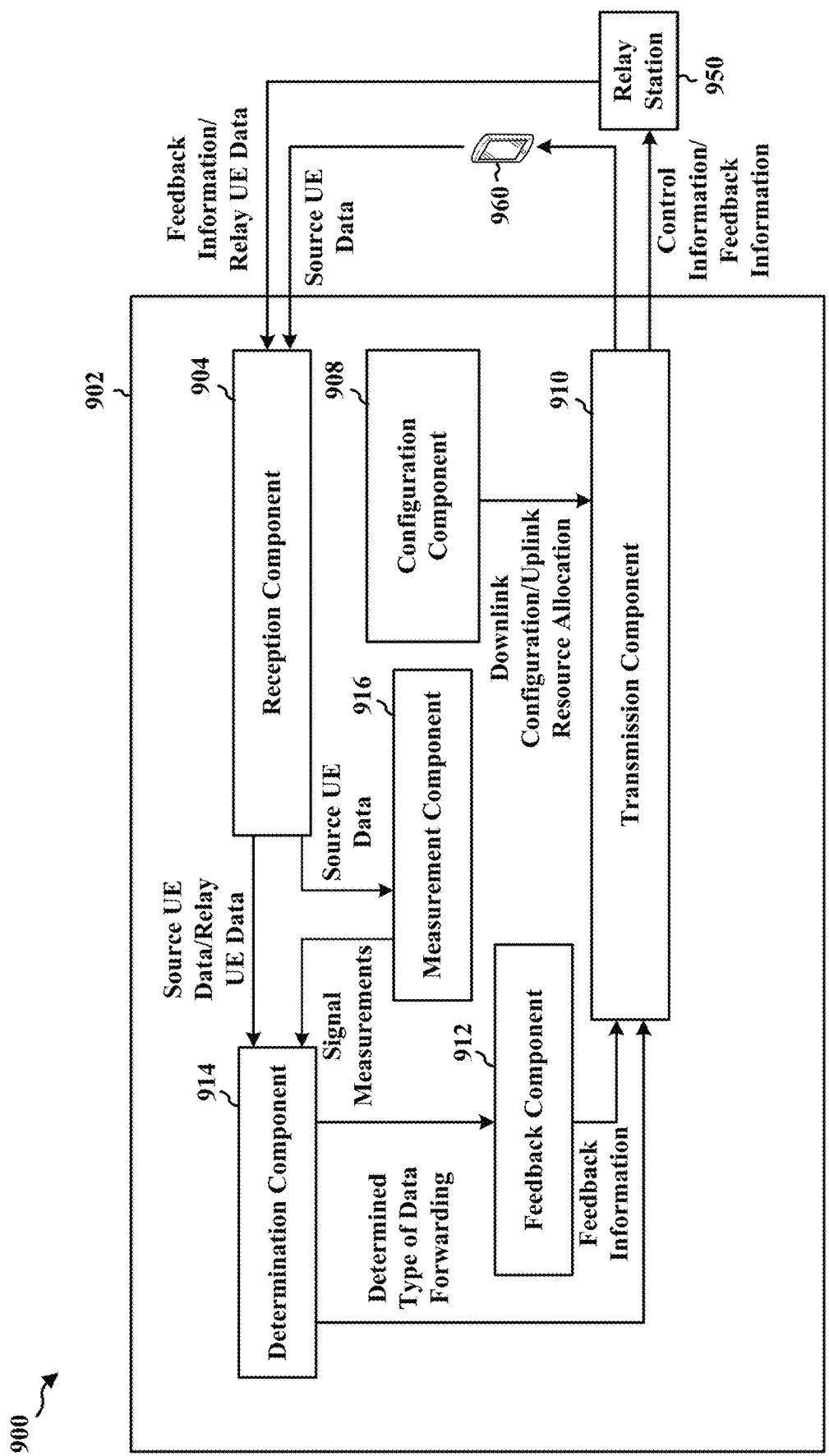
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a destination device or a component of a destination device. The apparatus includes a reception component 904 that receives communication from a relay station 950 and/or from a UE 960.

The reception component 904 may receive an uplink data transmission from the UE 960, e.g., as described above in connection with 804 in FIG. 8, and may communicate uplink resource allocation and control information with the UE 960, e.g., as described above in connection with 802 in FIG. 8. The reception component 904 may receive feedback information from the relay station 950, e.g., as described above in connection with 814 in FIG. 8, and may receive forwarding data from the relay station 950, e.g., as described above in connection with 816 in FIG. 8.

The apparatus includes a transmission component 910 configured to transmit communication to the relay station 950 and/or to the UE 960. The transmission component 910 may transmit control information to the relay station 950 and/or the UE 960, e.g., as described above in connection with 802 in FIG. 8, and may communicate feedback information with the relay station 950, e.g., as described above in connection with 812 in FIG. 8.

The apparatus 902 includes a feedback component 912 configured to generate feedback information that indicates whether the uplink data transmission is successfully received at the destination device and communicate the feedback information to the relay station 950, e.g., as described in connection with 812 in FIG. 8.

The apparatus includes a configuration component 908 configured to generate uplink resource allocation and provide the uplink resource allocation in a downlink configuration to the relay station 950, e.g., as described in connection with 802 in FIG. 8. The configuration component 908 also can generate downlink configuration and provide the downlink configuration to the relay station 950, e.g., as described in connection with 810 of FIG. 8.

The apparatus includes a measurement component 916 configured to obtain measurements of the uplink transmission from the UE 960, e.g., as described above in connection with 806 in FIG. 8.

The apparatus includes a determination component 914 configured to determine a type of data relaying configuration for the relay station 950 based on obtained signal measurements associated with the source uplink transmission, e.g., as described above in connection with 808 in FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
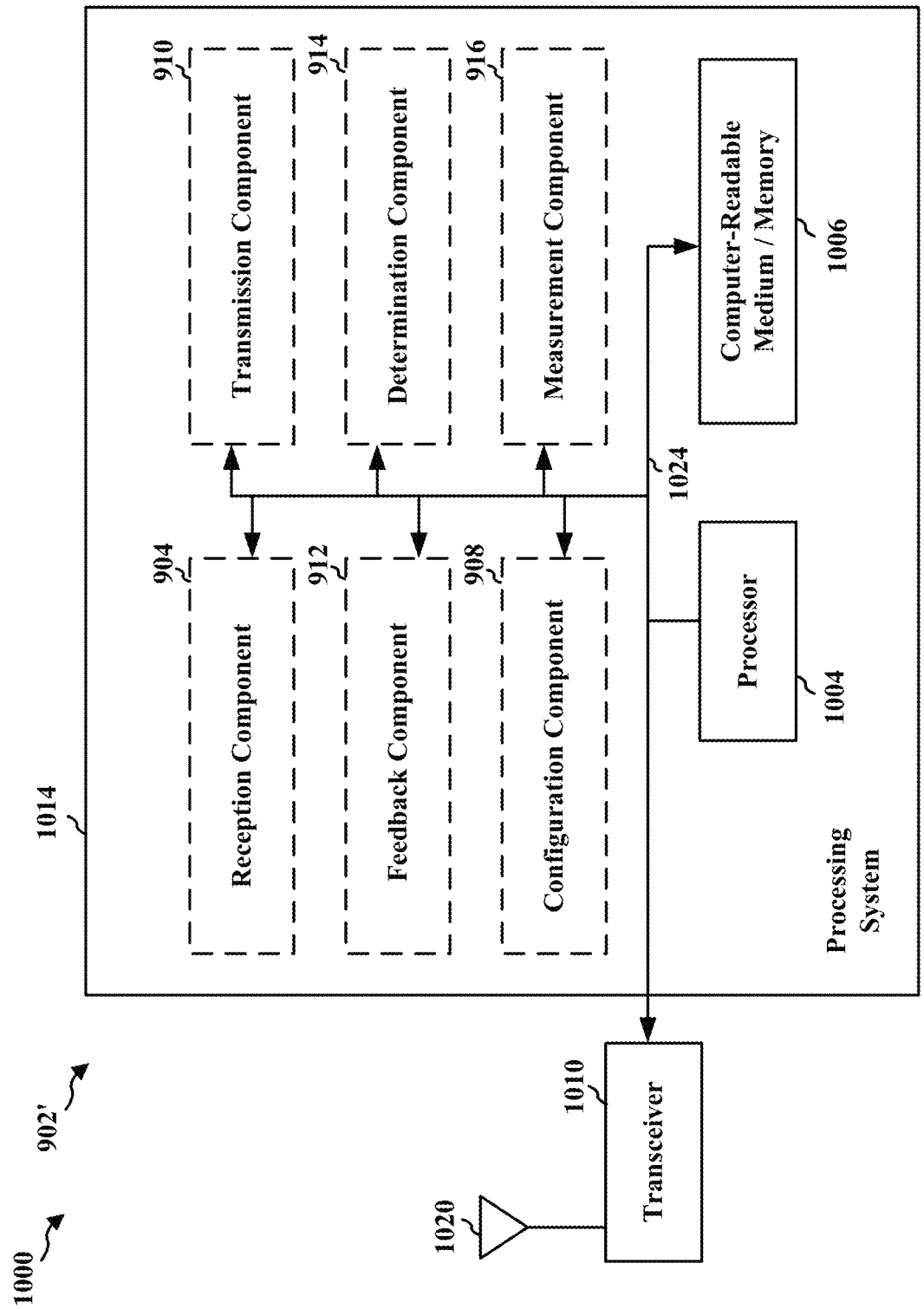
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 908, 910, 912, 914, and 916, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 908, 910, 912, 914, and 916. The components may be software components running in the processor 1004, resident/stored in the computer readable medium/memory 1006, one or more hardware components coupled to the processor 1004, or some combination thereof. In some implementations, the processing system 1014 may be a component of the base station 310 and may include the memory 376 and/or at least one of the TX processor 316, the RX processor 370, and the controller/processor 375. Alternatively, the processing system 1014 may be the entire base station (e.g., see 310 of FIG. 3). In other implementations, the processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 902/902' for wireless communication includes means for receiving, from a first UE of a plurality of UEs, a first data transmission. The apparatus includes means for communicating, with the plurality of UEs, a first feedback transmission associated with the first data transmission that indicates whether the first data transmission is successfully received at the BS. The apparatus includes means for receiving, from a second UE of the plurality of UEs, a second feedback transmission associated with the first data transmission when the first feedback transmission indicates that the BS does not successfully receive the first data transmission. The apparatus includes means for receiving, from the second UE, a second data transmission associated with the second feedback transmission, in which the second data transmission comprises at least a portion of the first data transmission. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316 or 368, the RX Processor 370 or 356, and the controller/processor 375 or 359. As such, in one configuration, the aforementioned means may be the TX Processor 316 or 368, the RX Processor 370 or 356, and the controller/processor 375 or 359 configured to perform the functions recited by the aforementioned means.

The following examples are illustrative only and may be combined with aspects of other embodiments or teachings described herein, without limitation.

Example 1 is a method of wireless communication performed by a first UE, the method comprising: receiving, from a second UE, a first data transmission on a first set of resources; receiving, from a destination device, a first feedback transmission associated with the first data transmission; determining whether the destination device successfully receives the first data transmission based on the first feedback transmission; communicating, with the destination device, a second feedback transmission associated with the first data transmission when the destination device does not successfully receive the first data transmission; and communicating, with the destination device, on a second set of resources corresponding to at least a portion of the first set of resources, a second data transmission associated with the second feedback transmission according to a type of data relaying, the second data transmission comprising at least a portion of the first data transmission, wherein the second data transmission is communicated using different types of data relaying based at least in part on the second feedback transmission.

In Example 2, the method of Example 1 further includes receiving, from the destination device, a first control transmission comprising a resource allocation assigned to one or more of the first UE or the second UE.

In Example 3, the method of any of Example 1 or Example 2 further includes determining whether the first UE is set to a first relay mode or a second relay mode based on a downlink configuration of the first UE.

In Example 4, the method of any of Examples 1 to 3 further includes that the first control transmission indicates a type of data relaying in an uplink transmission between the first UE and the destination device when the first UE is set to the first relay mode, the communicating the second data transmission comprises transmitting the second data transmission in a format that corresponds to the type of data relaying, and the type of data relaying corresponds to a first type of data relaying when the second feedback transmission indicates a positive acknowledgment (ACK) associated with the first data transmission and the type of data relaying corresponds a second type of data relaying different than the first type of data relaying when the second feedback transmission indicates a negative acknowledgment (NACK) associated with the first data transmission.

In Example 5, the method of any of Examples 1 to 4 further includes that the receiving the first control transmission comprises receiving the first control transmission semi-statically through one or more of a RRC signal or MAC-CE.

In Example 6, the method of any of Examples 1 to 4 further includes that the receiving the first control transmission comprises receiving the first control transmission dynamically through DCI.

In Example 7, the method of any of Examples 1 to 6 further includes obtaining measurements of the first data transmission; determining a type of data relaying in an uplink transmission between the first UE and the destination device based on the measurements when the first UE is set to the second relay mode; and transmitting, to the destination device, an indication of the type of data relaying in an uplink control information concurrently with the second feedback transmission, wherein the communicating the second data transmission comprises transmitting the second data transmission in a format that corresponds to the type of data relaying.

In Example 8, the method of any of Examples 1 to 7 further includes that the determining the type of data relaying comprises selecting one of a plurality of types of data forwarding in the uplink transmission between the first UE and the destination device based on the measurements of the first data transmission.

In Example 9, the method of any of Examples 1 to 8 further includes that the plurality of types of data forwarding comprises a decode-forward relaying scheme.

In Example 10, the method of any of Examples 1 to 8 further includes that the plurality of types of data forwarding comprises an amplify-forward relaying scheme.

In Example 11, the method of any of Examples 1 to 8 further includes that the plurality of types of data forwarding comprises a compress-forward relaying scheme.

In Example 12, the method of any of Examples 1 to 8 further includes that the plurality of types of data forwarding comprises a log-likelihood ratio (LLR)-forward relaying scheme.

In Example 13, the method of any of Examples 1 to 12 further includes that the first control transmission comprises a bitmap indicating which resource blocks within the resource allocation are assigned to the first UE.

In Example 14, the method of any of Examples 1 to 13 further includes that the communicating the second data transmission comprises transmitting, to the destination device, the second data transmission in the resource blocks indicated in the bitmap.

In Example 15, the method of any of Examples 1 to 14 further includes that the second data transmission comprises a data payload of the first data transmission.

In Example 16, the method of any of Examples 1 to 15 further includes receiving, from the destination device, a third feedback transmission associated with the second data transmission; determining whether the destination device successfully receives the second data transmission based on the third feedback transmission; and receiving, from the destination device, a second control transmission when the destination device does not successfully receive the second data transmission.

In Example 17, the method of any of Examples 1 to 16 further includes determining whether the first data transmission is successfully received, wherein the communicating the second feedback transmission comprises transmitting the second feedback transmission comprising an ACK signal associated with the first data transmission when the first data transmission is successfully received, and wherein the communicating the second feedback transmission comprises transmitting the second feedback transmission comprising a NACK signal associated with the first data transmission when the first data transmission is not successfully received; and determining whether the second feedback transmission comprises the ACK signal or the NACK signal.

In Example 18, the method of any of Examples 1 to 16 further includes encoding data of the first data transmission into encoded data based on a type of data relaying signaled between the first UE and the destination device, when the second feedback transmission comprises the ACK signal, wherein the communicating the second data transmission comprises transmitting the second data transmission comprising the encoded data.

In Example 19, the method of any of Examples 1 to 16 further includes determining LLR information associated with the first data transmission using a predetermined number of bits based on a type of data relaying signaled between the first UE and the destination device, when the second feedback transmission comprises the NACK signal, wherein the communicating the second data transmission comprises transmitting the second data transmission comprising at least in part the LLR information.

In Example 20, the method of any of Examples 1 to 19 further includes receiving, from the destination device, an indication of the predetermined number of bits per LLR through semi-static control information or dynamic control information.

In Example 21, the method of any of Examples 1 to 20 further includes amplifying data of the first data transmission into amplified data by weighting the first data transmission with one or more of weights and gain values based on a type of data relaying signaled between the first UE and the destination device, when the second feedback transmission comprises the NACK signal, wherein the communicating the second data transmission comprises transmitting the second data transmission comprising at least in part the amplified data.

In Example 22, the method of any of Examples 1 to 21 further includes compressing data of the first data transmission into compressed data by quantizing the first data transmission using a predetermined number of bits based on a type of data relaying signaled between the first UE and the destination device, when the second feedback transmission comprises the NACK signal, wherein the communicating the second data transmission comprises transmitting the second data transmission comprising at least in part the compressed data; and receiving, from the destination device, an indication of the predetermined number of bits per quantized received signal through semi-static control information or dynamic control information.

In Example 23, the method of any of Examples 1 to 22 further includes that the the receiving the first data transmission comprises receiving, over a physical sidelink shared channel (PSSCH) from the second UE, the first data transmission in a sidelink communication between the first UE and the second UE, the communicating the second feedback transmission comprises transmitting, over a physical sidelink feedback channel (PSFCH) to the destination device in the sidelink communication between the first UE and the second UE, the second feedback transmission, and the communicating the second data transmission comprises transmitting, over the PSSCH to the destination device in the sidelink communication between the first UE and the second UE, the second data transmission.

In Example 24, the method of any of Examples 1 to 23 further includes that the receiving the first data transmission comprises receiving, over a physical uplink shared channel (PUSCH) from the second UE in an uplink communication between the first UE and the second UE, the first data transmission based on the first UE having capability to receive an uplink transmission, the communicating the second feedback transmission comprises transmitting, over a physical uplink control channel (PUCCH) to the destination device in an uplink communication between the first UE and the destination device, the second feedback transmission, the communicating the second data transmission comprises transmitting, over the PUSCH to the destination device in the uplink communication between the first UE and the destination device, the second data transmission, and the second feedback transmission and the second data transmission being transmitted based on the destination device having capability to receive uplink transmissions.

In Example 25, the method of any of Examples 1 to 24 further includes that the first UE is a relay node between the second UE and the destination device.

Example 26 is a device including one or more processors and one or more memories in electronic communication with the one or more processors storing instructions executable by the one or more processors to cause a system or an apparatus to implement a method as in any of Examples 1 to 25.

Example 27 is a system or apparatus including means for implementing a method or realizing an apparatus as in any of Examples 1 to 25.

Example 28 is a non-transitory computer-readable medium storing instructions executable by one or more processors to cause the one or more processors to implement a method as in any of Examples 1 to 25.

Example 29 is a method of wireless communication performed by a destination device, the method comprising: receiving, from a first UE of a plurality of UEs, a first data transmission; communicating, with the plurality of UEs, a first feedback transmission associated with the first data transmission that indicates whether the first data transmission is successfully received at the destination device; receiving, from a second UE of the plurality of UEs, a second feedback transmission associated with the first data transmission when the first feedback transmission indicates that the destination device does not successfully receive the first data transmission; and receiving, from the second UE, a second data transmission associated with the second feedback transmission, the second data transmission comprising at least a portion of the first data transmission.

In Example 30, the method of Example 29 further includes combining at least a portion of data in the first data transmission with data in the second data transmission to recover the first data transmission.

In Example 31, the method of any of Example 29 or Example 30 further includes transmitting, to the plurality of UEs, a first control transmission comprising a resource allocation assigned to one or more of the first UE or the second UE.

In Example 32, the method of any of Examples 29 to 31 further includes that the first control transmission indicates a type of data relaying in an uplink transmission between the second UE and the destination device based on the second UE being set to a first relay mode, and the receiving the second data transmission comprises receiving the second data transmission in a format that corresponds to the type of data relaying.

In Example 33, the method of any of Examples 29 to 32 further includes that the transmitting the first control transmission comprises transmitting the first control transmission semi-statically through one or more of a RRC signal or a MAC-CE.

In Example 34, the method of any of Examples 29 to 33 further includes that the transmitting the first control transmission comprises transmitting the first control transmission dynamically through DCI.

In Example 35, the method of any of Examples 29 to 34 further includes receiving, from the second UE concurrently with the second feedback transmission, an indication of a type of data relaying for an uplink transmission between the second UE and the destination device through UCI, wherein the receiving the second data transmission comprises receiving the second data transmission in a format that corresponds to the type of data relaying.

In Example 36, the method of any of Examples 29 to 35 further includes that the first control transmission comprises a bitmap indicating which resource blocks within the resource allocation are assigned to the second UE.

In Example 37, the method of any of Examples 29 to 36 further includes that the receiving the second data transmission comprises receiving, from the second UE, the second data transmission in the resource blocks indicated in the bitmap.

In Example 38, the method of any of Examples 29 to 37 further includes transmitting, to the second UE, a third feedback transmission associated with the second data transmission, the third feedback transmission comprising an indication that the destination device does not successfully receive the second data transmission; and transmitting, to the plurality of UEs, a second control transmission comprising downlink control information.

In Example 39, the method of any of Examples 29 to 38 further includes that the second feedback transmission comprises an ACK signal or a NACK signal based on whether the second UE successfully receives the first data transmission.

In Example 40, the method of any of Examples 29 to 39 further includes that the receiving the second data transmission comprises receiving the second data transmission comprising encoded data based on a type of data relaying signaled between the second UE and the destination device, when the second feedback transmission comprises the ACK signal.

In Example 41, the method of any of Examples 29 to 40 further includes that the receiving the second data transmission comprises receiving the second data transmission comprising at least in part LLR information associated with the first data transmission using a predetermined number of bits based on a type of data relaying signaled between the second UE and the destination device, when the second feedback transmission comprises the NACK signal.

In Example 42, the method of any of Examples 29 to 41 further includes transmitting, to the second UE, an indication of the predetermined number of bits per LLR through semi-static control information or dynamic control information.

In Example 43, the method of any of Examples 29 to 42 further includes that the receiving the second data transmission comprises receiving the second data transmission comprising at least in part amplified data associated with a weighting of the first data transmission based on a type of data relaying signaled between the second UE and the destination device, when the second feedback transmission comprises the NACK signal.

In Example 44, the method of any of Examples 29 to 43 further includes that the receiving the second data transmission comprises receiving the second data transmission comprising at least in part compressed data associated with a quantization of the first data transmission using a predetermined number of bits based on a type of data relaying signaled between the second UE and the destination device, when the second feedback transmission comprises the NACK signal.

In Example 45, the method of any of Examples 29 to 44 further includes transmitting, to the second UE, an indication of the predetermined number of bits per quantized received signal through semi-static control information or dynamic control information.

In Example 46, the method of any of Examples 29 to 45 further includes obtaining measurements of the first data transmission; determining a type of data relaying in an uplink transmission between the second UE and the destination device based on the measurements; and transmitting, to the second UE, a downlink configuration comprising an indication of the type of data relaying.

In Example 47, the method of any of Examples 29 to 46 further includes that the measurements comprise at least one of: a first measurement report for a backhaul link between the second UE and the destination device, or a second measurement report indicating a SNR estimation for the first data transmission.

In Example 48, the method of any of Examples 29 to 47 further includes that the determining the type of data relaying comprises selecting one of a plurality of types of data forwarding in the uplink transmission between the second UE and the destination device based on the measurements of the first data transmission.

In Example 49, the method of any of Examples 29 to 48 further includes that the plurality of types of data forwarding comprises a decode-forward relaying scheme.

In Example 50, the method of any of Examples 29 to 49 further includes that the plurality of types of data forwarding comprises an amplify-forward relaying scheme.

In Example 51, the method of any of Examples 29 to 50 further includes that the plurality of types of data forwarding comprises a compress-forward relaying scheme.

In Example 52, the method of any of Examples 29 to 51 further includes that the plurality of types of data forwarding comprises a LLR-forward relaying scheme.

In Example 53, the method of any of Examples 29 to 52 further includes that the second UE is a relay node between the first UE and the destination device.

Example 54 is a device including one or more processors and one or more memories in electronic communication with the one or more processors storing instructions executable by the one or more processors to cause a system or an apparatus to implement a method as in any of Examples 1 to 53.

Example 55 is a system or apparatus including means for implementing a method or realizing an apparatus as in any of Examples 1 to 53.

Example 56 is a non-transitory computer-readable medium storing instructions executable by one or more processors to cause the one or more processors to implement a method as in any of Examples 1 to 53.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a first user equipment (UE), the method comprising: receiving, over a physical sidelink shared channel (PSSCH) in sidelink communication or over a physical uplink shared channel (PUSCH) in uplink communication from a second UE, a first data transmission on a first set of resources; receiving, from a destination device, a first feedback transmission associated with the first data transmission; determining whether the destination device successfully receives the first data transmission based on the first feedback transmission; communicating, over a physical sidelink feedback channel (PSFCH) in sidelink communication or over a physical uplink control channel (PUCCH) in uplink communication with the destination device, a second feedback transmission associated with the first data transmission based on the destination device-not successfully receiving the first data transmission; and communicating, over the PSSCH in sidelink communication or over the PUSCH in uplink communication with the destination device, on a second set of resources corresponding to at least a portion of the first set of resources, a second data transmission associated with the second feedback transmission according to a type of data relaying, the second data transmission comprising at least a portion of the first data transmission, wherein the second data transmission is communicated using the type of data relaying, of a plurality of different types of data relaying, based at least in part on the second feedback transmission.

2. The method of claim 1, further comprising:
receiving, from the destination device, a first control transmission comprising a resource allocation assigned to one or more of the first UE or the second UE; and
determining whether the first UE is set to a first relay mode or a second relay mode based on a downlink configuration of the first UE,
wherein:
the first control transmission indicates the type of data relaying, of the plurality of different types of data relaying, in an uplink transmission between the first UE and the destination device based on the first UE being set to the first relay mode,
the communicating the second data transmission comprises transmitting, over the PUSCH to the destination device, the second data transmission in a format that corresponds to the type of data relaying, and
the type of data relaying corresponds to a first type of data relaying based on the second feedback transmission indicating a positive acknowledgment (ACK) associated with the first data transmission and the type of data relaying corresponds a second type of data relaying different than the first type of data relaying based on the second feedback transmission indicating a negative acknowledgment (NACK) associated with the first data transmission.

3. The method of claim 2, wherein the receiving the first control transmission comprises receiving the first control transmission, semi-statically, through one or more of a radio resource control (RRC) signal or a media access control (MAC) control element (MAC-CE).

4. The method of claim 2, wherein the receiving the first control transmission comprises receiving the first control transmission dynamically through downlink control information (DCI).

5. The method of claim 2, further comprising:
obtaining measurements of the first data transmission;
determining the type of data relaying in an uplink transmission between the first UE and the destination device based on the measurements based on the first UE being set to the second relay mode; and
transmitting, over the PUCCH to the destination device, concurrently with the second feedback transmission, an indication of the type of data relaying in an uplink control information (UCI) included in the PUCCH,
wherein the determining the type of data relaying comprises selecting one of a plurality of types of data forwarding in the uplink transmission between the first UE and the destination device based on the measurements of the first data transmission.

6. The method of claim 5, wherein the plurality of types of data forwarding comprises a decode-forward relaying scheme.

7. The method of claim 5, wherein the plurality of types of data forwarding comprises an amplify-forward relaying scheme.

8. The method of claim 5, wherein the plurality of types of data forwarding comprises a compress-forward relaying scheme.

9. The method of claim 5, wherein the plurality of types of data forwarding comprises a log-likelihood ratio (LLR)-forward relaying scheme.

10. The method of claim 2, wherein:
the first control transmission comprises a bitmap indicating which resource blocks within the resource allocation are assigned to the first UE or which data in the resource blocks is forwarded by the first UE using one of a plurality of types of data forwarding in an uplink transmission to the destination device, and the communicating the second data transmission comprises transmitting, to the destination device, the second data transmission in the resource blocks indicated in the bitmap.

11. The method of claim 1, wherein the second data transmission comprises a data payload of the first data transmission.

12. The method of claim 1, further comprising:
receiving, from the destination device, a third feedback transmission associated with the second data transmission;
determining whether the destination device successfully receives the second data transmission based on the third feedback transmission; and
receiving, from the destination device, a second control transmission based on the destination device not successfully receiving the second data transmission.

13. The method of claim 1, further comprising:
determining whether the first data transmission is successfully received,
wherein the communicating the second feedback transmission comprises transmitting, over the PUCCH to the destination device, the second feedback transmission comprising an acknowledgment (ACK) signal associated with the first data transmission based on the first data transmission being successfully received,
wherein the communicating the second feedback transmission comprises transmitting, over the PUCCH to the destination device, the second feedback transmission comprising a negative ACK (NACK) signal associated with the first data transmission based on the first data transmission not being successfully received; and
determining whether the second feedback transmission comprises the ACK signal or the NACK signal.

14. The method of claim 13, further comprising:
encoding data of the first data transmission into encoded data based on the type of data relaying signaled between the first UE and the destination device, based on the second feedback transmission comprising the ACK signal,
wherein the communicating the second data transmission comprises transmitting the second data transmission comprising the encoded data.

15. The method of claim 13, further comprising:
determining log-likelihood ratio (LLR) information associated with the first data transmission using a predetermined number of bits based on a type of data relaying signaled between the first UE and the destination device, based on the second feedback transmission comprising the NACK signal, wherein the communicating the second data transmission comprises transmitting the second data transmission comprising at least in part the LLR information; and
receiving, from the destination device, an indication of the predetermined number of bits per LLR through semi-static control information or dynamic control information.

16. The method of claim 15, further comprising:
amplifying data of the first data transmission into amplified data by weighting the first data transmission with one or more of weights and gain values based on a type of data relaying signaled between the first UE and the destination device, based on the second feedback transmission comprising the NACK signal, wherein the communicating the second data transmission comprises transmitting the second data transmission comprising at least in part the amplified data.

17. The method of claim 16, further comprising:
compressing data of the first data transmission into compressed data by quantizing the first data transmission using a predetermined number of bits based on the type of data relaying signaled between the first UE and the destination device, based on the second feedback transmission comprising the NACK signal, wherein the communicating the second data transmission comprises transmitting the second data transmission comprising at least in part the compressed data; and
receiving, from the destination device, an indication of the predetermined number of bits per quantized received signal through semi-static control information or dynamic control information.

18. An apparatus for wireless communication at a first user equipment (UE), comprising: a transceiver; a memory; and at least one processor, coupled to the memory and the transceiver, and configured to cause the first UE to: receive, over a physical sidelink shared channel (PSSCH) in sidelink communication or over a physical uplink shared channel (PUSCH) in uplink communication from a second UE, via the transceiver, a first data transmission on a first set of resources; receive, from a destination device, via the transceiver, a first feedback transmission associated with the first data transmission; determine whether the destination device successfully receives the first data transmission based on the first feedback transmission; communicate, over a physical sidelink feedback channel (PSFCH) in sidelink communication or over a physical uplink control channel (PUCCH) in uplink communication with the destination device, via the transceiver, a second feedback transmission associated with the first data transmission-based on the destination device-not successfully-receiving the first data transmission; and communicate, over the PSSCH in sidelink communication or over the PUSCH in uplink communication with the destination device, via the transceiver, on a second set of resources corresponding to at least a portion of the first set of resources, a second data transmission associated with the second feedback transmission according to a type of data relaying, the second data transmission comprising at least a portion of the first data transmission, wherein the second data transmission is communicated using the type of data relaying, of a plurality of different types of data relaying, based at least in part on the second feedback transmission.

19. The apparatus of claim 18, wherein the at least one processor is further configured to cause the first UE to: receive, from the destination device, via the transceiver, a first control transmission comprising a resource allocation assigned to one or more of the first UE or the second UE; and determine whether the first UE is set to a first relay mode or a second relay mode based on a downlink configuration of the first UE, wherein: the first control transmission indicates the type of data relaying, of the plurality of different types of data relaying, in an uplink transmission between the first UE and the destination device based on the first UE being set to the first relay mode, the at least one processor is further configured to cause the first UE to communicate, via the transceiver, the second data transmission comprises transmitting, over the PUSCH to the destination device, the second data transmission in a format that corresponds to the type of data relaying, and the type of data relaying corresponds to a first type of data relaying based on the second feedback transmission indicating a positive acknowledgment (ACK) associated with the first data transmission and the type of data relaying corresponds a second type of data relaying different than the first type of data relaying based on the second feedback transmission indicating a negative acknowledgment (NACK) associated with the first data transmission.

20. The apparatus of claim 19, wherein the at least one processor is further configured to cause the first UE to:
obtain measurements of the first data transmission;
determine the type of data relaying in an uplink transmission between the first UE and the destination device based on the measurements based on the first UE being set to the second relay mode; and
transmit, over the PUCCH to the destination device, concurrently with the second feedback transmission, via the transceiver, an indication of the type of data relaying in an uplink control information (UCI) included in the PUCCH,
wherein the communication of the second data transmission comprises to transmit, via the transceiver, the second data transmission in a format that corresponds to the type of data relaying.

21. The apparatus of claim 19, wherein the at least one processor is further configured to cause the first UE to:
receive, from the destination device, via the transceiver, a third feedback transmission associated with the second data transmission;
determine whether the destination device successfully receives the second data transmission based on the third feedback transmission; and
receive, from the destination device, via the transceiver, a second control transmission based on the destination device not successfully receiving the second data transmission.

22. The apparatus of claim 19, wherein the at least one processor is further configured to cause the first UE to:
determine whether the first data transmission is successfully received,
transmit, via the transceiver, the second feedback transmission comprising an acknowledgment (ACK) signal associated with the first data transmission based on the first data transmission being successfully received,
transmit, via the transceiver, the second feedback transmission comprising a negative ACK (NACK) signal associated with the first data transmission based on the first data transmission not being successfully received; and
determine whether the second feedback transmission comprises the ACK signal or the NACK signal.

23. The apparatus of claim 22, wherein the at least one processor is further configured to cause the first UE to:
encode data of the first data transmission into encoded data based on the type of data relaying signaled between the first UE and the destination device, based on the second feedback transmission comprising the ACK signal,
wherein the communication of the second data transmission comprises to transmit, via the transceiver, the second data transmission comprising the encoded data.

24. The apparatus of claim 22, wherein the at least one processor is further configured to cause the first UE to:
determine log-likelihood ratio (LLR) information associated with the first data transmission using a predetermined number of bits based on the type of data relaying signaled between the first UE and the destination device, based on the second feedback transmission comprising the NACK signal, wherein the communication of the second data transmission comprises to transmit, via the transceiver, the second data transmission comprising at least in part the LLR information; and
receive, from the destination device, an indication of the predetermined number of bits per LLR through semi-static control information or dynamic control information.

25. The apparatus of claim 22, wherein the at least one processor is further configured to cause the first UE to:
amplify data of the first data transmission into amplified data by weighting the first data transmission with one or more of weights and gain values based on the type of data relaying signaled between the first UE and the destination device, based on the second feedback transmission comprising the NACK signal,
wherein the communication of the second data transmission comprises to transmit, via the transceiver, the second data transmission comprising at least in part the amplified data.

26. The apparatus of claim 25, wherein the at least one processor is further configured to cause the first UE to:
compress data of the first data transmission into compressed data by quantizing the first data transmission using a predetermined number of bits based on the type of data relaying signaled between the first UE and the destination device, based on the second feedback transmission comprising the NACK signal,
wherein the communication of the second data transmission comprises to transmit, via the transceiver, the second data transmission comprising at least in part the compressed data.

27. A method of wireless communication performed by a destination device, the method comprising: receiving, over a physical sidelink shared channel (PSSCH) in sidelink communication or over a physical uplink shared channel (PUSCH) in uplink communication from a first user equipment (UE) of a plurality of UEs, a first data transmission on a first set of resources; communicating, with the plurality of UEs, a first feedback transmission associated with the first data transmission that indicates whether the first data transmission is successfully received at the destination device; receiving, over a physical sidelink feedback channel (PSFCH) in sidelink communication or over a physical uplink control channel (PUCCH) in uplink communication from a second UE of the plurality of UEs, a second feedback transmission associated with the first data transmission based on the first feedback transmission indicating that the destination device does not successfully receive the first data transmission; and receiving, over the PSSCH in sidelink communication or over the PUSCH in uplink communication from the second UE, on a second set of resources corresponding to at least a portion of the first set of resources, a second data transmission associated with the second feedback transmission according to a type of data relaying, the second data transmission comprising at least a portion of the first data transmission, wherein the second data transmission is communicated using the type of data relaying, of a plurality of different types of data relaying, based at least in part on the second feedback transmission.

28. An apparatus for wireless communication at a destination device, comprising: a transceiver; a memory; and at least one processor, coupled to the memory and the transceiver, and configured to cause the destination device to: receive, over a physical sidelink shared channel (PSSCH) in sidelink communication or over a physical uplink shared channel (PUSCH) in uplink communication from a first user equipment (UE) of a plurality of UEs, via the transceiver, a first data transmission on a first set of resources; communicate, with the plurality of UEs, via the transceiver, a first feedback transmission associated with the first data transmission that indicates whether the first data transmission is successfully received at the destination device; receive, over a physical sidelink feedback channel (PSFCH) in sidelink communication or over a physical uplink control channel (PUCCH) in uplink communication from a second UE of the plurality of UEs, via the transceiver, a second feedback transmission associated with the first data transmission based on the first feedback transmission indicating that the destination device does not successfully receive the first data transmission; and receive, over the PSSCH in sidelink communication or over the PUSCH in uplink communication from the second UE, via the transceiver, on a second set of resources corresponding to at least a portion of the first set of resources, a second data transmission associated with the second feedback transmission according to a type of data relaying, the second data transmission comprising at least a portion of the first data transmission, wherein the second data transmission is communicated using the type of data relaying, of a plurality of different types of data relaying, based at least in part on the second feedback transmission.

\* \* \* \* \*